United States Patent
Gonzales et al.

(10) Patent No.: US 11,184,455 B1
(45) Date of Patent: Nov. 23, 2021

(54) STREAMING CONVERSION

(71) Applicant: T-Mobile USA, Inc., Bellevue, WA (US)

(72) Inventors: Brock Gonzales, Seattle, WA (US); Symreet Mann, Dallas, TX (US); Robert R. Norris, Olathe, KS (US); Joseph C. Tapscott, Los Angeles, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/228,623

(22) Filed: Apr. 12, 2021

(51) Int. Cl.
*H04L 29/08* (2006.01)

(52) U.S. Cl.
CPC ...... *H04L 67/2823* (2013.01); *H04L 67/1095* (2013.01); *H04L 67/306* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,473,794 B1* | 10/2002 | Guheen | ................ | H04L 41/22 709/223 |
| 6,606,744 B1* | 8/2003 | Mikurak | ................ | H04L 29/06 717/174 |
| 6,701,345 B1* | 3/2004 | Carley | ................ | G06F 16/252 709/205 |
| 8,635,272 B2* | 1/2014 | Reisman | ............ | G06Q 30/0601 709/203 |
| 2005/0259641 A1* | 11/2005 | Beninato | ............ | H04M 1/0202 370/354 |
| 2017/0279867 A1* | 9/2017 | Morton | ................ | G06Q 10/10 |
| 2018/0349254 A1* | 12/2018 | Hui | ................ | G06F 11/3692 |

\* cited by examiner

*Primary Examiner* — Davoud A Zand
(74) *Attorney, Agent, or Firm* — Lee & Hayes, P.C.

(57) ABSTRACT

Systems and methods for identifying conversion eligible legacy user profiles for conversion from a legacy production environment to a production operating environment are discussed herein. The system can include an eligibility engine configured to determine the conversion eligible legacy profiles within the legacy operating environment, a conversion coordinator configured to monitor the conversion process and provide information during the conversion process, and a data injection system that creates the production user profiles within the production operating environment while the production operating environment is live. The system can identify the conversion eligible legacy user profiles, replicate the legacy user profiles within a conversion environment, resolve eligibility issues associated with the legacy user profiles, and map information from the legacy user profiles to a production user profile.

20 Claims, 8 Drawing Sheets

STREAMING CONVERSION

BACKGROUND

Presently, when a user is transferred from a legacy environment to a production environment, the process of converting a user profile associated with the user from the legacy environment to the production environment is completed in large batches of user profiles. In particular, the large batches of user profiles are taken offline into a conversion environment, the user profiles are prepared and injected into the production environment. During the conversion process, the legacy environment and the production environment are partially taken offline to update the respective databases associated with the user profiles with the converted user profiles. Accordingly, the users associated with the user profiles being converted, during the batch conversion, are unable to access either of the legacy environment and the production environment for the duration of the conversion process for the entire batch. Additionally, the user profiles are inaccessible for the duration of the conversion process for the batch of user profiles being converted.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
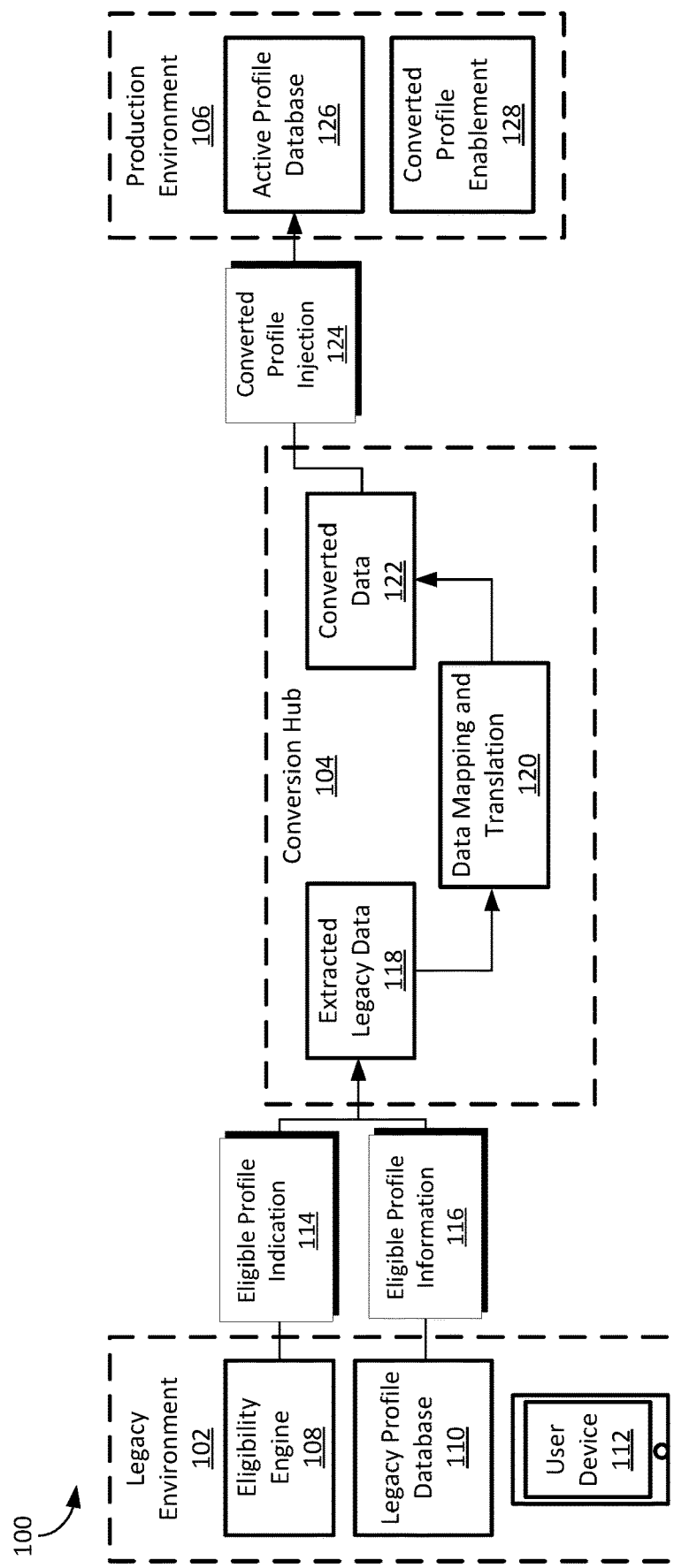
FIG. 1 depicts a block diagram of a legacy environment that provides a legacy user profile to a conversion hub for conversion of the legacy user profile to a production user profile and injection of the public user profile into the production environment.

This disclosure describes systems, devices, and techniques for converting user profiles associated with a legacy environment to a production environment in substantially real-time. In particular, the described techniques can be configured to identify user profiles within the legacy environment (e.g., legacy user profiles) that are in a conversion-ready state, replicate the user profiles within a conversion environment, and generate a converted profile for a user associated with the user profile within the production environment. Additionally, the conversion environment can be associated with or include an eligibility engine that identifies the legacy user profiles that are eligible for conversion. Further, the conversion environment can be configured to extract or receive legacy user profiles from the legacy environment, translate legacy user profile data from the legacy user profiles into production user data, and inject a production user profile into the production environment while the production environment is active. Accordingly, the conversion environment can be configured to process a stream of user profiles while maintaining legacy environment and/or production environment operations.

Additionally, the described systems and methods can be configured to detect user profiles associated with legacy environment (e.g., legacy billing environment) that satisfy one or more profile status checks, wherein a legacy user profile that satisfies the one or more profile status checks can be flagged (or otherwise identified) for conversion by an eligibility engine. In particular, the user profile can be flagged for conversion from the legacy environment to a production environment (e.g., a current billing environment), wherein conversion includes conversion of legacy user data associated with the user profile and injection of production user data into a production user profile associated with the production environment.

In some examples, an eligibility engine can be configured to monitor user events that are associated with legacy user profiles within a legacy environment to determine whether the legacy user profiles satisfy one or more profile status checks. In particular, the one or more user profile checks can include an eligibility check to determine legacy user profile eligibility for conversion by a conversion engine. Additionally, upon determination that a legacy user profile is eligible for conversion, the eligibility engine can lock the legacy user profile and/or cause the legacy user profile to be locked upon conversion initiation. Similarly, the eligibility engine can cause the legacy user profile to be replicated within a conversion engine for conversion to a production environment. Further, during the conversion process, an event-based conversion orchestrator can be configured to monitor the conversion process, resolve flagged conversion issues, and publish conversion information to various systems associated with the conversion process. Accordingly, the described systems and methods can be configured to process a stream of customers in substantially real-time by converting legacy user data associated with the user profile to converted user data that can be injected as a converted user profile into the production environment.

In some examples, an eligibility engine can be configured to detect user profiles in a legacy environment that can be converted and to replicate legacy user data within the conversion environment. In particular, the eligibility engine can be configured to run profile status checks that identify legacy user profiles that achieve an eligible state for conversion from the legacy environment to the production environment. Additionally, the eligibility engine can be configured to identify conversion-eligible legacy user profiles on a substantially continuous basis (or periodic, aperiodic, etc.) through the utilization of user event monitoring. For example, the eligibility engine can be configured to monitor the legacy user profiles within the legacy environment and identify user events within the legacy environment that indicate that the legacy user profiles have been updated. Further, the user events can trigger an evaluation of the legacy user profiles by the eligibility engine. Accordingly, the eligibility engine can include a set of eligibility rules that are utilized to execute one or more profile data checks that determine whether a legacy user profile is to be converted from the legacy environment to the production environment.

In some examples, a conversion orchestrator can be configured to manage a conversion engine, resolve conversion check failures that occur during conversion of legacy user data, and push conversion information to various conversion systems for the legacy customer. In particular, the conversion orchestrator can be configured to direct systems associated with the conversion environment to obtain legacy user data, obtain the legacy user data, distribute the legacy user data, monitor the conversion process from the legacy user data to production user data, resolve and/or report conversion errors, and manage transmission of data within the conversion process. Additionally, the conversion orchestrator can be configured to manage internal checks for accurate conversion between legacy user data and production user data, retrieve conversion and/or translation data from one or more databases, and report conversion statuses for the legacy user profile via a dashboard. Accordingly, the conversion orchestrator can be configured as an interface between the conversion engine and associated conversion systems to ensure effective and accurate conversion from legacy user data to production user data.

In some examples, an injection system can be configured to receive converted user data, generate a converted user profile, and inject the converted user data into production environment in substantially real-time. In particular, the injection system can be configured to generate a production user profile for a user associated with a legacy user profile for integration into a production environment. Additionally, the injection system can be configured, similar to the conversion engine as a whole, to minimize downtime for the user associated with the legacy user profile. Further, the injection system can be configured to transfer user access from the legacy user profile to the production user profile once the conversion process is complete and the production user profile has been injected into the production environment. Accordingly, the user can be transferred from the legacy user profile to the production user profile that has been injected into a live production environment.

In some examples, the described methods and systems can facilitate substantially continuous, periodic, and/or aperiodic conversion operations that transfer legacy user profiles between a legacy environment and a production environment. In particular, a legacy environment can contain legacy users that have not converted or transitioned into a current operating environment. Additionally, the legacy environment and the current operating environment can perform similar or identical services resulting in redundant systems, current operating environments supporting legacy environment operations, and user information being stored and managed by distinct systems. However, when a legacy user profile is identified as being eligible for conversion to the current operating environment, the described methods and systems can enable the user to be transitioned from the legacy environment to the current operating environment. Currently, transitioning legacy users to current operating environments is a large batch process that converts large numbers of users during a time intensive process that requires extended periods of downtime for at least the users being converted. Accordingly, the described systems and methods can enable the continuous processing of individual legacy users, converting the legacy users to the current operating environment, and enabling the legacy users in the current operating environment with an updated user profile. Further, the continuous identification and conversion of legacy users enables both legacy environment downtime, production operating environment downtime, and user impact to be minimized.

FIG. 1 is a block diagram illustrating a network 100 according to some examples. Network 100 can be configured to enable conversion from a legacy environment 102, via a conversion hub 104, to a production environment 106. In particular, the legacy environment 102 can include or be associated with at least an eligibility engine 108, a legacy profile database 110, and a user device 112. Upon identifying a conversion-eligible legacy user profile, the eligibility engine 108 can transmit an eligible profile indication 114 and the legacy profile database 110 can transmit eligible profile information 116 to the conversion hub 104. Additionally, the conversion hub 104 can receive legacy data 118, execute data mapping and translation 120, and generate converted data 122. Further, the conversion hub 104 can generate a production user profile for the user associated with the legacy user profile. More specifically, the conversion hub 104 can create the production user profile within an active profile database 126 of the production environment 106, wherein the production environment 106 can execute a converted profile enablement 128 that grants a user access to the production user account.

In some examples of FIG. 1, the legacy environment 102 can be a network, a system (e.g., a billing system, an advertising system, etc.), or other operating environment that is associated with one or more legacy user profiles. In particular, the legacy environment 102 can be a previous production environment that is being discontinued, abandoned, rebuilt, and/or modified such that legacy user profiles are to be converted to data formats utilized by user profiles in the production environment 106. Additionally, the legacy environment 102 can be associated with the eligibility engine 108 and the one or more legacy user profiles can be stored by the legacy profile database 110.

In some examples of FIG. 1, the eligibility engine 108 can be configured to monitor the one or more legacy user profiles and determine whether the one or more legacy user profiles are in a conversion-eligible state. In particular, the eligibility engine 108 can be configured to monitor the one or more legacy user profiles on an event-driven basis. For example, the eligibility engine 108 can receive an indication from the legacy environment 102, the legacy profile database 110, and/or an associated system that a legacy user profile of the one or more legacy user profiles has been updated. The legacy user profile can be updated by the legacy environment 102, the user associated with the legacy user profile, an authorized individual associated with the legacy user profile, and/or by the network 100 associated with the legacy environment 102. Independent of the update source, the eligibility engine 108 can receive the indication of the user action and initiate an eligibility check for the legacy user profile to determine whether the legacy user profile can be converted from the legacy environment 102 to the production environment 106.

In some additional examples of FIG. 1, the eligibility engine 108 can be configured to monitor the one or more legacy user profiles and determine whether the one or more legacy user profiles are in a conversion-eligible state. In particular, the eligibility engine 108 can be configured to monitor the one or more legacy user profiles on a substantially continuous basis. For example, the eligibility engine 108 can be configured to monitor the one or more legacy user profiles within the legacy profile database 110 and detect when a legacy user profile receives an update from an associated user (or the legacy environment 102/network 100). Additionally, the eligibility engine 108 can be configured to determine whether the legacy user profile is eligible for conversion to the production environment 106 as a whole and/or whether the update to the legacy user profile enables conversion of the legacy user profile by resolving one or more profile issues that previously prevented the legacy user profile from being converted. Similar to the example above, the eligibility engine 108 can be configured to initiate an eligibility check for the legacy user profile based on a detected update to the legacy user profile. Alternatively, or in addition, the eligibility engine 108 can be configured to substantially continuously execute the eligibility check for the one or more legacy user profiles associated with the legacy environment 102 to identify the legacy user profile(s) that are in a conversion-eligible state.

In some further examples of FIG. 1, the eligibility engine 108 can be configured to monitor the one or more legacy user profiles and determine whether the one or more legacy user profiles are in a conversion-eligible state. In particular, the eligibility engine 108 can be configured to monitor the one or more legacy user profiles on a substantially periodic basis or an aperiodic basis. It should be noted that the substantially periodic basis can cause the eligibility engine 108 to periodically identify a set of legacy user profiles that are in a conversion-eligible state for conversion to the production environment 106. Additionally, the substantially periodic basis can be defined by an amount of time that expires after a first eligibility check that then causes a second eligibility check to be initiated. Similarly, the aperiodic basis can cause the eligibility engine 108 to identify the set of legacy user profiles that are in the conversion-eligible state at individually set eligibility checks. Independent of whether the eligibility engine 108 performs eligibility checks on the substantially periodic basis or the aperiodic basis, the amount of time between eligibility checks and/or individual eligibility checks can be determined by an administrator associated with the legacy environment 102, the conversion hub 104, the production environment 106, the network 100, and/or other systems associated with the network 100. Accordingly, the eligibility checks executed by the eligibility engine 108 can be scheduled to identify conversion eligible legacy user profile(s).

In some examples of FIG. 1, the eligibility engine 108 can be configured to execute an eligibility check to identify a set of legacy user profiles that are in a conversion eligible state. In particular, the eligibility engine 108 can be configured to determine, based at least on one or more profile characteristics associated with a legacy user profile, whether the legacy user profile is in the conversion-eligible state. Further, the one or more profile characteristics utilized to determine whether the legacy user profile is in the conversion-eligible state can include subscription status, payment method, user information, account utilization information, account settings, and other information stored in association with the legacy user profile (e.g., stored by the legacy profile database 110). It should be noted that the eligibility engine 108 can be configured to execute a plurality of eligibility checks to determine whether the legacy user profile is in any of a plurality of conversion-eligible states or the eligibility check can be configured to determine whether the legacy user profile is in any of the plurality of conversion-eligible states. Additionally, the eligibility engine 108 can be configured to execute a first eligibility check on a first basis (e.g., event-based, periodic, aperiodic, continuous, etc.) and a second eligibility check on a second basis. Accordingly, when the eligibility engine 108 triggers the eligibility check(s) for the legacy user profile, the eligibility engine 108 can request the one or more profile characteristics associated with the legacy user profile from the legacy profile database 110 and/or other databases associated with the legacy environment 102.

In some examples of FIG. 1, the eligibility engine 108 can be configured to identify a set of legacy user profiles that are in a conversion-eligible state from the one or more legacy user profiles associated with the legacy environment 102. As noted above, the eligibility engine 108 can be configured to determine whether a legacy user profile is in a conversion-eligible state based at least on one or more profile parameters associated with the legacy user profile. In particular, and in response to a determination that the legacy user profile is conversion-eligible, the eligibility engine 108 can flag the legacy user profile for conversion and initiate the conversion of the legacy user profile. Additionally, the legacy user profile that has been flagged for conversion can be locked by the legacy environment 102, the legacy profile database 110, the network 100, and/or other systems associated with the legacy user profile. Accordingly, the legacy user profile can be determined to be conversion-eligible, identified to the legacy environment 102 as conversion-eligible, and locked to prevent further modification that may invalidate the conversion-eligible status.

In some examples, the eligibility engine 108 can cause the legacy user profile to be flagged for conversion and/or locked to prevent modification to the legacy user profile. Alternatively, or in addition, the eligibility engine 108 can cause the legacy user profile to be flagged for conversion and subsequently locked upon initiation of the conversion process. In particular, the eligibility engine 108 can generate an eligible profile indication 114 that is transmitted to the conversion hub 104. Additionally, the eligibility engine 108 can cause eligible profile information 116 to be provided from the legacy profile database 110 to the conversion hub 104. For example, the eligibility engine 108 can transmit a provision request to the legacy profile database 110 that causes the eligible profile information 116 to be transmitted to the conversion hub 104. Alternatively, or in addition, the eligible profile indication 114 can cause the conversion hub 104 to request the eligible profile information 116 from the legacy profile database 110. Additionally, the eligibility engine 108 can flag the legacy user profile as conversion-eligible and cause the legacy environment 102 to transmit the eligible profile indication 114 and/or the eligible profile information 116 to the conversion hub 104. Independent of how the eligible profile indication 114 and the eligible profile information 116 are provided to the conversion hub 104, the eligible profile indication 114 can provide an indication of the conversion-eligible state of the legacy user profile and the eligible profile information 116 can include profile information associated with the legacy user profile that is to be converted for injection into the production environment 106. The profile information can include user information such as payment information, user preferences, subscription information, and other information associated with the legacy user profile that is to be converted and injected into the production environment 106. Accordingly, the conversion hub 104 can be provided and/or request the eligible profile information 116 that is utilized to generate a production user profile for the user associated with the legacy user profile.

In some examples, the conversion hub 104 can receive the eligible profile indication 114 and the eligible profile information 116 from the legacy environment 102 and/or a system associated with the legacy environment 102 (e.g., the eligibility engine 108). In particular, the conversion hub 104 can store the eligible profile indication 114 and the eligible profile information 116 as extracted legacy data 118. Additionally, the conversion hub 104 can analyze the extracted legacy data 118 to generate converted data 122. More specifically, the extracted legacy data 118 can be mapped to data formats associated with a converted data template and subsequently translated to generate the converted data 122. Further, the eligible profile information 116 within the extracted legacy data 118 can be utilized to populate a converted data template and generate the converted data 122. Accordingly, the conversion environment can generate profile information for injection into the production environment 106 as a production user profile.

In some examples, the converted data 122 generated by the conversion hub 104 can undergo a converted profile injection 124. In particular, the converted profile injection 124 can include the creation and injection of a production user profile in the production environment 106 based at least on the converted data 122. Additionally, the converted profile injection 124 can generate the production user profile within the production environment 106 while the production environment 106 is live (e.g., actively providing service to and receiving requests from users associated with the production environment 106). Further, the converted profile injection 124 can initiate the transition of the user associated with the legacy environment 102 from the legacy user profile to the production user profile within the production environment 106. Accordingly, the process of transitioning the user and converting the legacy user profile from the legacy environment 102 to the production environment 106 can be done in substantially real-time and with minimal interruption to user service via the associated user profile (e.g., the legacy user profile and/or the production user profile.

In some examples, the conversion hub 104 can inject a production user profile into an active profile database 126 associated with the production environment 106. In particular, the production environment 106 can include an active profile database 126 that is configured to maintain one or more production user profiles associated with the production environment 106 for providing service and receiving requests from associated users. Additionally, the active profile database 126 can be configured to include signaling that enables the conversion hub 104 to provide a production user profile, that includes converted legacy data, to the production environment 106 while the production environment 106 is live. Further, the active profile database 126 can further be configured to receive the converted profile injection 124 and hold the converted profile information until a converted profile enablement 128 is provided by the production environment 106. In at least one example, the active profile database 126 can be configured to maintain the production user profile in a locked status (e.g., inaccessible and/or unmodifiable by the user associated with the production user profile) until the production user profile is unlocked by the conversion coordinator, the data injection system, the production environment 106, and/or other system associated with the conversion environment/production environment. Accordingly, the user can be transitioned from the legacy environment 102 to the production environment 106 with minimal downtime for the user and the respective environment that the user is associated with.

Figure 2:
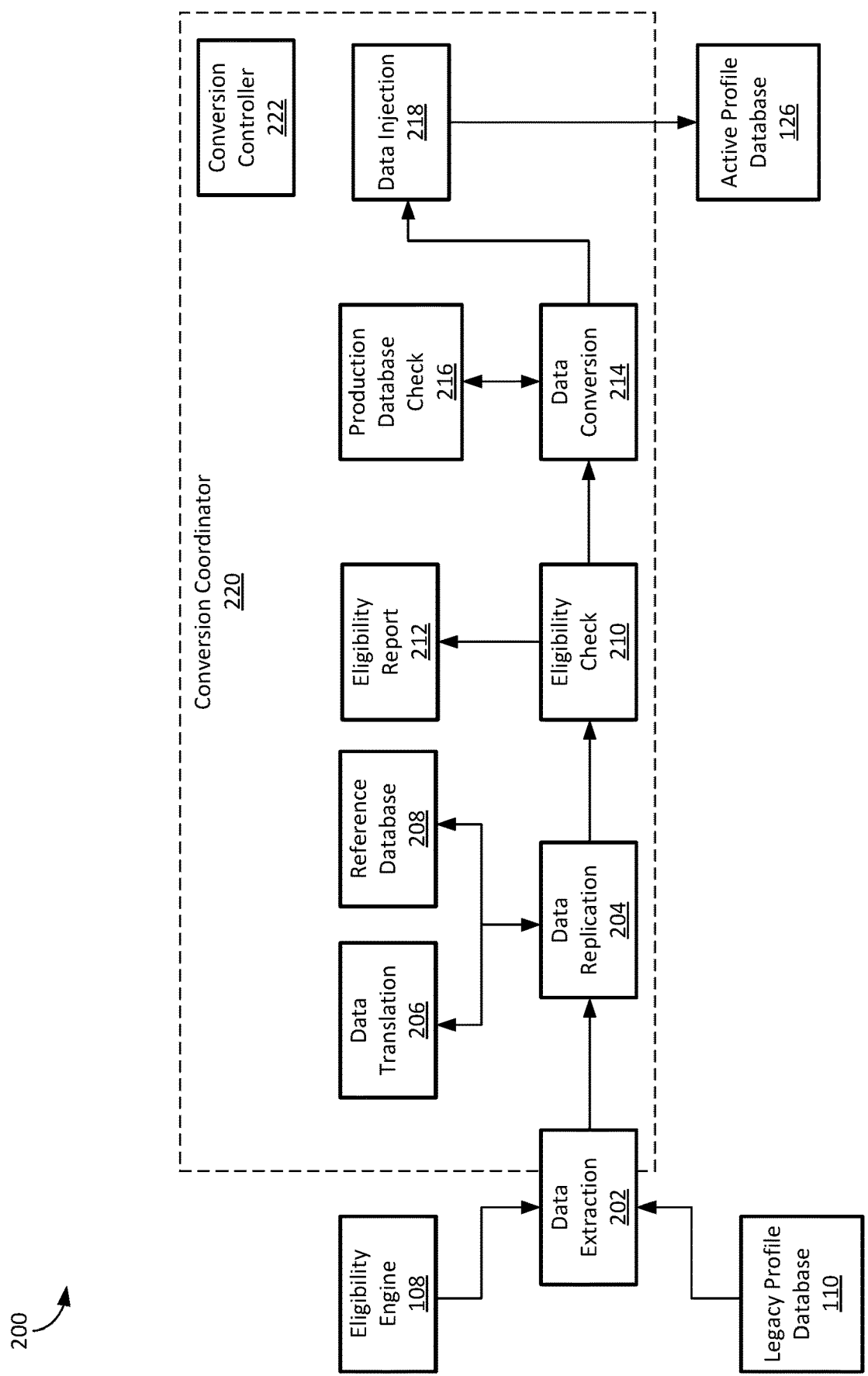
FIG. 2 is a block diagram of a conversion environment for converting a user profile between a legacy environment and a production environment that is managed by a conversion coordinator.

FIG. 2 is a block diagram illustrating a conversion environment 200 according to some examples. It should be noted that the conversion environment 200 can be configured to perform actions descried for the conversion hub 104. In particular, the conversion environment 200 can be configured to communicate with eligibility engine 108 and legacy profile database 110 to obtain legacy user profiles for conversion to a production environment. Additionally, a data extraction system 202 can obtain the legacy user profile and/or the legacy user data from the eligibility engine 108 and/or the legacy profile database 110, providing the legacy user data for a data replication 204 system. Data replication can communicate with a data translation system 206 and a database (e.g., reference database 208). An eligibility check 210 can be internal to the conversion environment 200 and generate an eligibility report 212. Accordingly, the conversion environment can include the data conversion system 214 that converts the legacy user data to production user data, complete a production database check 216, and trigger a data injection 218 for the converted user data into an active profile database 126.

In some examples, and as similarly described for FIG. 1, the eligibility engine 108 and the legacy profile database 110 can respectively provide an indication of conversion eligible profile(s) and a source for legacy account information. In particular, a data extraction system 202 can be configured to obtain the legacy profile data from the legacy profile database 110 in response to the indication of conversion eligible profile(s). Additionally, the eligibility engine 108 can be configured to generate a conversion-eligible queue for legacy user profiles that have been determined as conversion-eligible. The data extraction system 202 can be configured to issue queries and/or requests to the legacy profile database 110 that obtain and/or cause the legacy profile database to provide legacy profile information that can be utilized for data translation 206 and by the data conversion system 214. Alternatively, or in addition, the data extraction system 202 can be configured to receive an indication of the legacy user profile from the eligibility engine and the legacy profile information from the eligibility engine 108, the legacy profile database 110, and/or a legacy environment 102 associated with the eligibility engine 108/the legacy profile database 110. Accordingly, the data extraction system 202 can be configured to obtain the legacy profile information or to receive the legacy profile information stored by the legacy profile database 110. Further, the legacy profile information can be transmitted to the data replication system 204 for further processing.

In some examples, data replication can be performed by a data replication system 204 that is configured to replicate the legacy user profile and the legacy profile information within the conversion environment 200. In particular, the data replication system 204 can be configured to receive the legacy user profile and the legacy profile information from the data extraction 202 system and replicate (e.g., duplicate, copy, create a data equivalent of the information within the legacy environment, etc.) the legacy user profile within the conversion environment such that the legacy user profile can be converted to the production environment. In at least one example, the legacy user profile can be converted to the production environment with minimal interaction with the legacy environment after extraction of the legacy user profile. Independent of the interactions with the legacy environment, the data replication system 204 can be configured to generate a replica data source within the conversion environment that enables reporting workflows, internal conversion checks, and the conversion process. More specifically, the data replication system 204 can generate the replica data source such that the replica data source is actionable (e.g., interactable, modifiable, mutable, etc.) within the conversion environment for data translation 206, data mapping, data conversion, data reporting (e.g., eligibility report 212), and other related actions.

In some examples, the data replication system 204 can be configured to inject the replica data source, generated from the legacy user profile and/or the legacy profile information, into the conversion environment 200 for utilization by other components and/or systems of the conversion environment 200. In particular, the data extraction system 202 and the data replication system 204 can be configured to extract, replicate, and inject the legacy user profile and/or the legacy profile information to generate the replica data source that is substantially equivalent to the legacy user profile and/or the legacy profile information. Additionally, the replica data source generated by the data replication system 204 can be stored within a database associated with the conversion environment 200 and be available to other components for data calls and/or queries during the conversion process. Accordingly, the data replication system 204 (and the data extraction system 202) can enable the streaming conversion of legacy user profiles from the legacy environment to the production environment by extracting and replicating the legacy user profile and the legacy profile information. For example, the data extraction system 202 and the data replication system 204 can generate the replica data source substantially similar to the legacy user profile and the legacy profile information as they exist in the legacy environment. Additionally, the data replication system 204 can be configured to insulate the conversion environment from the legacy environment. By generating the replica data source to be actionable within the conversion environment, the conversion environment and the legacy environment can be in limited communication such that once extraction of the legacy user profile and the legacy profile information occurs, the replica data source is utilized for conversion while the legacy user profile remains unchanged within the legacy environment. Accordingly, the legacy profile information associated with the legacy user profile can be extracted for conversion with minimal impact on the legacy environment other than the extraction of the legacy user profile and the legacy profile information from the legacy profile database 110.

In some examples, the data extraction system 202 and the data replication system 204 can be configured to extract and replicate legacy profile information associated with a legacy user. In particular, the data extraction system 202 and the data replication system 204 can be configured to extract and replicate current legacy profile information that is associated with a current state of the legacy user profile. In addition, the data extraction system 202 and the data replication system 204 can be configured to extract and replicate historical legacy profile information that is associated with the legacy user profile. For example, the current legacy profile information can include current subscription plan, billing information, customer preferences, and other indications that are associated with the legacy user profile and how the legacy user profile interacts with the legacy environment. Additionally, the historical legacy profile information can include previous interactions between the legacy user profile and the legacy environment including historical transactions, user actions, usage patterns of the legacy user profile, call logs, and other information associated with utilization of and/or actions completed by the legacy user profile. Further, the historical legacy profile information can include information generated during and/or associated with a time period (e.g., one day, one week, one month, six months, one year, etc.). Accordingly, the replica data source can be configured to include both current legacy profile information associated with the current state of the legacy user profile and historical legacy profile information associated with past actions and/or utilizations of the legacy user profile.

Additionally, the data replication system 204 (or the replica data source generated by the data replication system 204) can be in communication with a data translation system 206. In particular, the data translation system 206 can be configured to identify a set of data within the legacy profile information of the replica data source and determine a translation for the set of data from a legacy format to a production format. Additionally, the determination of the translation can be completed based at least on a reference database 208. The reference database 208 can include mapping data that identifies corresponding data sets between the legacy environment and the production environment. For example, a legacy user profile that is associated with a first subscription to the legacy environment can include first data, second data, and third data of a legacy format. Further, the reference database 208 can include an association between the first subscription to the legacy environment and a second subscription to the production environment. Accordingly, the reference database 208 can include reference information that maps the first data, the second data, and/or the third data of the first subscription to the second subscription such that the legacy user profile can be converted to a production user profile and the first data, the second data, and/or the third data can be utilized to populate the second subscription of the production user profile based at least on the reference information.

In some examples, the data translation system 206 can be in communication with the data replication system 204 such that the replica data source is associated with translation data that enables translation of the legacy data format (e.g., a data format specific to the legacy profile information) to the production data format (e.g., a data format utilized to stored converted profile information in association with the production user profile). In particular, the legacy profile information extracted from the legacy environment and replicated to create the replica data source can include legacy data format(s), legacy data structure(s), and other metadata (e.g., data that describes and/or gives information related to other data such as the legacy profile information) that is relevant to comprehension and utilization of the legacy profile information. Additionally, the data translation system 206 and the reference database 208 can introduce a framework for converting the legacy data format(s), the legacy data structure(s), and other metadata into production data format(s), production data structure(s), and associated metadata such that the production environment can utilize the legacy profile information once the legacy profile information is converted into the production profile information. Accordingly, the data translation system 206 can be configured to map (e.g., identify a portion of the legacy profile information that can be utilized to populate a second portion of the production profile information) the legacy user profile onto the production user profile. Further, the data translation system 206 can be configured to provide translation information that can be utilized during conversion of the legacy profile information to the production profile information.

In some examples, the conversion environment 200 can perform an eligibility check 210 and generate an eligibility report 212 regarding conversion of the legacy user profile to the production user profile. In particular, the eligibility check 210 can be configured to determine whether the replication data source, the translation data, and the mapping of the legacy profile information to the production profile information satisfies one or more technical eligibility rules. Additionally, the technical eligibilities rules can be configured determine whether the replica data source, the translation data, and/or the mapping data associated with the legacy profile information and the production profile information are capable of undergoing the conversion process from the legacy environment to the production environment. Further, the technical eligibility rules can be configured to identify whether an error in the replica data source, translation data, and/or mapping data (e.g., a portion of the relevant data is either not properly translated, is missing mapping data between the legacy environment and production environment, etc.) requires manual intervention, will prevent conversion, and/or can be resolved by an internal system of the conversion environment. Accordingly, the eligibility report 212 can be generated based on the technical eligibility rules and whether the technical eligibility rules are satisfied by the replication data source, the translation data, and/or the mapping data.

In some examples, and where the eligibility report 212 indicates that the replication data source and associated translation/mapping data is in an acceptable state for conversion, a data conversion system 214 can convert the legacy profile information to production profile information. In particular, the data conversion system 214 can utilize the translation data and the mapping data to extract the legacy profile information, convert the legacy profile information to production profile information, and populate the production user profile with the generated production profile information. Accordingly, the data conversion system 214 can generate the production user profile, generate the production profile information, and store the production user profile populated with the production profile information for injection into the production environment. Further, the converted production user profile can undergo a production database check 216 to determine whether the legacy profile information has been converted into the production profile information. Similar to the eligibility check 210, the production database check 216 can utilize one or more conversion rules to determine whether the legacy user profile has been correctly converted to generate the production user profile and generate a conversion report regarding the state of the production user profile.

In some examples, a data injection 218 can receive the production user profile and the production profile information generated by the data conversion system 214 and insert the production user profile into the active profile database 126. In particular, the data injection 218 can be configured to receive, from the data conversion system 214 and based at least on the production user profile satisfying the production database check 216, the production user profile and transfer the production user profile populated with the production profile information within the production environment. As discussed with respect to FIG. 1, the active profile database 126 can include signaling that enables the data injection 218 to occur while the production environment is live (e.g., active, providing user services, and receiving requests from users). Additionally, the data injection 218 enables the user associated with the legacy environment and the legacy user profile to be transferred to the production environment and the production user profile with minimal interruption to service. Accordingly, the data injection 218 creates the production user profile within the production environment and enables the transfer of users from the legacy environment to the production environment with minimal disruption for the transferred users, the legacy environment, and/or the production environment.

In some examples, a conversion coordinator 220 can be configured to monitor the conversion environment 200 and resolve issues within the conversion process. In particular, the conversion coordinator 220 can be configured to monitor data transmission between components of the conversion environment, provide telemetry and dashboarding for the conversion process, and monitor reports generated by conversion process components. Additionally, the conversion coordinator 220 can be configured to provide direction for data transmissions and/or act as a centralized data transmission hub for communications between components of the conversion environment 200. For example, the conversion coordinator 220 can be configured to manage data extractions by the data extraction system 202 for legacy user profiles as individual legacy user profiles are identified by the eligibility engine 108. The indication of conversion eligibility for a legacy user profile can be received by the conversion coordinator 220 such that the conversion coordinator 220 initiates the data extraction 202 and the conversion process. Further, the conversion coordinator 220 can then monitor and/or manage the transmission of the extracted legacy profile data to the data replication system 204, the data translation system 206, the data conversion system 214, and ultimately to the production environment via the data injection 218. Accordingly, the conversion coordinator can be configured to ensure that individual components of the conversion environment 200 are provided the information utilized to perform each components function.

In some additional examples, the conversion coordinator 220 can be configured to monitor the conversion environment 200 and resolve issues within the conversion process. In particular, the conversion coordinator 220 can be configured to monitor reports generated by conversion process components. Additionally, the conversion coordinator 220 can be configured to receive the reports (e.g., the eligibility report 212, a conversion report generated by the production database check 216, etc.) and/or the metadata associated with profile data within the conversion process (e.g., mapping and translating data generated by the data translation system 206). Further the conversion coordinator 220 can be configured to modify the state of the legacy profile information and the conversion process of the legacy user profile based at least on the received reports and/or metadata. For example, the conversion coordinator 220 can receive translation data and mapping data generated by the data translation system 206 based on the reference database 208 to determine whether the legacy profile data is corrected mapped to the production profile data for translation. Additionally, the conversion coordinator 220 can receive translation data and mapping data generated by the data translation system 206 based on the reference database 208 to determine whether the production data format identified for the legacy data format is an appropriate conversion for the legacy user profile based on the legacy user information (e.g., ensuring that a first subscription type of the legacy environment is being correctly converted into a second subscription type of the production environment). Accordingly, and independent of the specific portion of the translation data and the mapping data generated by the data translation system 206, the conversion coordinator can be configured to ensure accurate translation of data from the legacy user profile to the production user profile.

In at least one additional example, the conversion coordinator 220 can receive the eligibility report 212 and identify eligibility issues flagged by the technical eligibility rules. In particular, the conversion coordinator 220 can be configured to receive the eligibility report 212, identify the eligibility issues flagged (if any are flagged), and determine whether the eligibility issues can be resolved. Alternatively, or in addition, the conversion coordinator 220 can determine that there are no outstanding eligibility issues and transmit the replica data source to the data conversion system 214. Additionally, the conversion coordinator 220 can be configured to distinguish between resolvable eligibility issues and eligibility issues that are to receive manual intervention (e.g., user associated with legacy user profile is to provide additional information and/or administrator associated with the conversion environment is to intervene). Accordingly, the conversion coordinator 220 can resolve the eligibility issue(s), forward the legacy profile information (with or without annotations that describe actions to be taken) to a conversion component that can resolve the eligibility issue(s), and/or cause conversion of the legacy user profile to be suspended pending resolution of the eligibility issue(s).

In at least one further example, the conversion coordinator 220 can receive a report from the production database check 216 and identify conversion issues flagged by the production database check 216. In particular, the conversion coordinator 220 can be configured to receive the report, identify the conversion issues flagged (if any are flagged), and determine whether the conversion issues can be resolved. Alternatively, or in addition, the conversion coordinator 220 can determine that there are no outstanding conversion issues and initiate the data injection 218 to the production environment. Additionally, the conversion coordinator 220 can be configured to distinguish between resolvable conversion issues and conversion issues that are to receive manual intervention (e.g., administrator associated with the conversion environment is to intervene). Accordingly, the conversion coordinator 220 can resolve the conversion issue(s), forward the converted profile information (with or without annotations that describe actions to be taken) to a conversion component that can resolve the eligibility issue(s), and/or cause injection of the production user profile to be suspended pending resolution of the conversion issue(s).

In some additional examples, the conversion coordinator 220 can be configured to provide telemetry and dashboarding for the conversion process. In particular, the conversion coordinator 220 can be monitor the conversion process for one or more legacy user profiles, determine progress for the one or more legacy user profiles within the conversion process, and generate a user interface that displays progress information for the one or more legacy user profiles. Additionally, the conversion coordinator 220 can be configured to track actions that have been applied to the one or more legacy user profiles during the conversion process. For example, the conversion coordinator can track input legacy profile information, translation data, mapping data, output production profile information, statistics regarding processing time for the one or more legacy user profiles, and other related data regarding the conversion process. Accordingly, the tracked data can be configured for display to an administrator and/or other users of the conversion environment 200 for review.

In some examples, the conversion controller 222 can be configured to provide control actions for the conversion process, to monitor the conversion coordinator 220, and/or to monitor the conversion environment 200. In particular, the conversion controller 222 can be configured as an independent system, as a component of the conversion environment 200, and/or a component of the conversion coordinator 220 that provides an interface for implementing control actions that comprise initiating the conversion of legacy user profiles, stopping the conversion of legacy user profiles, aborting the conversion of legacy user profiles, limiting conversion throughput for one or more systems associated with the conversion environment 200 (e.g., data extraction system 202, data replication system 204, conversion coordinator 220, etc.) and/or other control actions associated with the conversion environment. Additionally, the conversion controller 222 can be associated with a user interface that enables an administrator to push a button or otherwise provide an indication that triggers one or more control actions for the conversion environment 200. Further, and optionally in combination with the telemetry and dashboarding of the conversion coordinator 220, the conversion controller 222 can be configured to provide throughput (e.g., number of legacy user profiles converted per period of time) adjustment and manual control over the systems associated with the conversion environment (e.g., start/stop conversion, throughput dial/indicator that moderates the conversion rate, etc.). Accordingly, the conversion controller 222 can enable control actions to be implemented for moderating the configuration of the conversion environment 200 and the systems associated with the conversion environment 200.

In some additional examples, the conversion controller 222 can enable substantially automated control actions for the conversion environment 200 and the systems associated with the conversion environment 200. In particular, the individual systems associated with the conversion environment 200 can be configured to publish (or otherwise provide) one or more indications regarding conversion process and outcomes for the conversion of a legacy user profile. For example, the data replication system 204 can be configured to publish indications of individual subscription, service associations, and user information replication completion during replication of the legacy profile information to generate the replica data source. Additionally, the conversion controller 222 (optionally via the conversion coordinator 220) can be configured to detect the publication of the indications and determine whether a control action is to be implemented. Further, the control action that is implemented in response to the publication of the indications can be manually defined by an administrator such that detected indications are associated with the appropriate control action to be implemented. In at least one example, the conversion controller 222 can be configured to flag conversion of a legacy user profile for manual intervention where a step in the conversion process (e.g., data extraction, data replication, data conversion, data mapping, etc.) takes an amount of time that exceeds an average completion time for the step by a threshold value. In at least one additional example, the conversion controller 222 can be configured to cause additional conversion resources (e.g., local computing resources, cloud computing resources, etc.) to be allocated to a system associated with the conversion environment 200 in response to the conversion system being associated with a legacy user profile queue that exceeds a threshold value (e.g., more than 10 users in queue).

In some further examples, the conversion controller 222 can utilize machine learning techniques (e.g., neural networks, machine learning algorithms, etc.) to trigger a control action. In particular, administrator triggered control actions can be recorded in combination with the conversion variables associated with the control actions (e.g., indicators published by systems associated with the conversion process, indicators published for conversion progress and outcomes, whether conversion was completed, etc.). Additionally, the administrator triggered control action and/or additional graded scenarios (e.g., manually determined conversion variable sets with associated control actions) can be utilized to train a machine learning algorithm to determine whether a control action is to be implemented. For example, the conversion controller 222 can be configured to determine whether a system associated with the conversion process (e.g., data extraction system 202, data replication system 204, conversion coordinator 220, etc.) is operating correctly (e.g., determine whether current conversion variables associated with the data replication system 204 indicate that a number of legacy profiles failing to be replicated exceeds a threshold value, determine whether conversion coordinator 220 is transmitting information between systems correctly, etc.) and/or whether the system associated with the conversion process is a rate-limiting conversion operation. Accordingly, the conversion controller 222 can be trained to recognize abnormal system operation within the conversion environment 200 and determine a control action to be implemented in response to the abnormal system operation. Alternatively, or in addition, the conversion controller 222 can be configured to escalate the abnormal system operation for manual (e.g., administrator) intervention.

Figure 3:
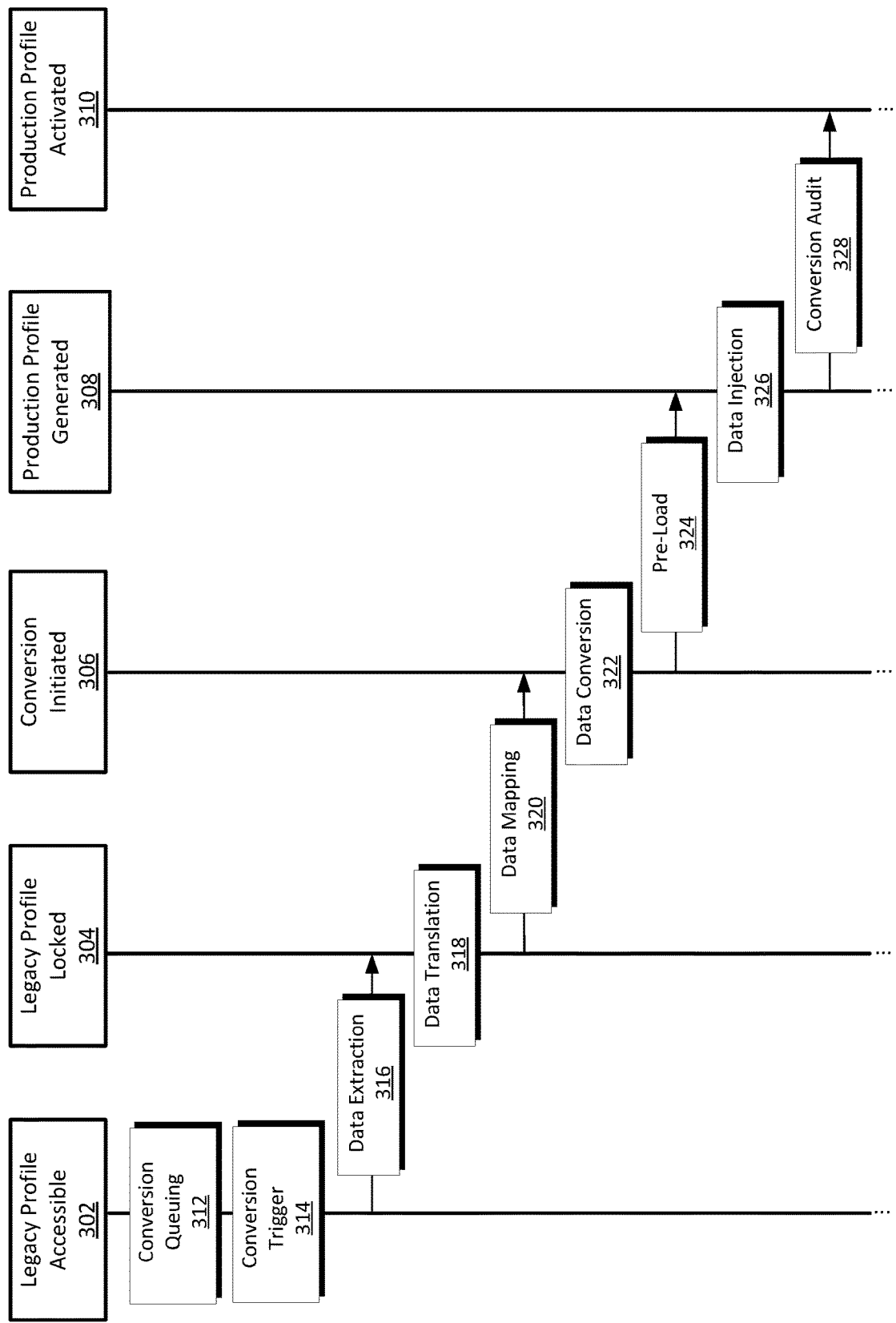
FIG. 3 is a timing diagram for a conversion process that transitions a user from a legacy user profile to a production user profile in substantially real-time.

FIG. 3 illustrates a timing diagram for a conversion process that transitions a user from a legacy user profile to a production user profile in substantially real-time. In particular, the conversion process can include a series of timeframes where the legacy user profile is accessible (block 302), the legacy user profile is locked (block 304), the conversion of the legacy user profile to the production user profile is initiated (block 306), the production user profile is generated (block 308), and the production user profile is enabled (block 310). It should be noted that the conversion process can include additional steps such as unlocking the legacy user profile (e.g., due to eligibility report indicating further information is required from user), disconnecting the legacy user profile (e.g., user has been transitioned to production user profile and no longer utilizes legacy user profile), converting secondary information associated with the legacy user profile (e.g., eligibility issue resolved by conversion environment administrator), and other accessory process steps.

At block 312, the legacy user profile can be accessible to one or more users associated with the legacy user profile and be flagged for conversion from the legacy environment to the production environment. In particular, the conversion queue can be associated with an eligibility engine and/or other related system that is configured to evaluate whether the conversion process can be initiated for the legacy user profile. As discussed above by FIG. 1 and FIG. 2, the legacy user profile can be identified as a part of a user population that is associated with the legacy environment and is to be converted from the legacy environment to the production environment. Additionally, the legacy user profile can remain active for utilization by the one or more associated users to minimize customer impact and touchpoints between the conversion process and the user experience within the legacy environment.

At block 314, the conversion process can determine that the legacy user profile is conversion-eligible and trigger conversion of the legacy user profile from the legacy environment to the production environment. As discussed above by FIG. 1 and FIG. 2, an eligibility engine can determine, based at least on the legacy profile information associated with the legacy user profile, whether the legacy user profile satisfies an eligibility check. The eligibility check can be configured to determine whether the legacy user profile is associated with legacy profile information that can be converted to production profile information utilized to populate a production user profile. Accordingly, a determination that the legacy user profile passes the eligibility check can cause the eligibility engine to trigger the conversion process for the legacy user profile. Alternatively, a determination that the legacy user profile fails the eligibility check can cause the eligibility engine (or a conversion coordinator in response to the indication that the eligibility check was failed) to return the legacy user profile to the conversion queue and/or to identify one or more deficiencies that caused the legacy user profile to fail the eligibility check. Further, the eligibility engine can be configured to monitor the legacy user profile for the one or more deficiencies to be resolved. Upon detecting that the one or more deficiencies has been resolved, the eligibility engine can be configured to trigger the conversion of the legacy user profile. It should be noted that the detection of the legacy user profile resolving the one or more deficiencies can trigger priority conversion of the legacy user profile (e.g., bypassing the conversion queuing) and/or can occur during a second eligibility check applied by the eligibility engine.

In some examples, and in response to determining that the legacy user profile failed an eligibility check, the legacy user profile can be flagged for targeted resolution of the one or more deficiencies associated with the legacy user profile. In particular, the eligibility engine and/or an associated system can be configured to resolve the one or more deficiencies. For example, the legacy user profile can be associated with a subscription plan unassociated with an equivalent subscription plan within the production environment. In response, the eligibility engine can flag the subscription plan incompatibility with the production environment as a deficiency that resulted in failure of the eligibility check. Additionally, a marketing system can be caused (e.g., by the eligibility engine and/or the conversion coordinator transmitting an indication of the subscription plan incompatibility) to generate rate plans, subscription offers, promotional offers, and other related incentives for causing the subscription plan associated with the legacy user profile to be altered to an additional subscription plan such that the deficiency is resolved. In at least one additional example, the legacy user profile can be associated with a network application of the legacy environment that utilizes one or more profile elements during operation. Additionally, an equivalent network application within the production environment can utilize the one or more profile elements and an additional profile element that is unassociated with the legacy user profile. In response, the network application can be caused to request the additional profile element such that the legacy user profile can be converted to the production user profile while maintaining service provided by the network application and the equivalent network application. Accordingly, the eligibility engine (and/or other systems associated with the eligibility engine such as the conversion coordinator) can be configured to cause network systems associated with the legacy user profile to resolve the one or more deficiencies associated with the legacy user profile and identified by the eligibility check.

At block 316, the conversion process can initiate data extraction from the legacy user profile. It should be noted that the data extraction from the legacy user profile can be performed in a manner described above with respect to FIG. 1 and FIG. 2. In addition, the data extraction can utilize one or more data loading processes for acquiring the legacy profile information from the legacy user profile. The one or more data loading processes can include schedule of events within an event-based architecture, utilization of a data injection system, application programming interfaces (APIs), data replication, data requests, and other data acquisition processes. For example, APIs (and data replication, copying, acquisition processes, etc. utilizing APIs) can enable requests to be issued by a system to access information associated with an additional system such that the additional system responds with structured information (e.g., legacy profile information) in response to the API request. In at least one additional example, the event-based architecture (or message-based architecture) can enable a system to obtain the legacy profile information by publishing an event (or a message) to one or more additional systems. Additionally, an additional system of the one or more additional systems can be configured to complete one or more actions (e.g., providing the legacy profile information) in response to the event (or the message) being published within the event-based (or message-based) architecture. Accordingly, the event-based (or message-based) architecture can enable information acquisition to be decentralized and/or abstracted such that the legacy profile information associated with the event (or message) is provided to the system publishing the event (or the message) by the additional system(s) associated with the legacy profile information based on the additional system(s) being configured to respond to the event (or the message) with the legacy profile information. In at least one further example, the data injection system can enable the eligibility engine, in response to determining that the legacy user profile is conversion-eligible, to inject (or to cause the injection of) the legacy profile information into the conversion environment.

At block 318, the conversion process can initiate data translation for the legacy profile information obtained by the conversion environment from the legacy user profile. In particular, the data translation can be substantially similar to the data translation discussed by FIG. 1 and FIG. 2. Additionally, the data translation can occur after the data extraction from the legacy user profile and while the legacy user profile has been locked. It should be noted that the process of locking the legacy user profile can occur after the data extraction to hold the legacy user profile in stasis so that additional changes to the legacy profile information prevented that could remove the legacy user profile from conversion eligibility. Alternatively, or in addition, the process of locking the legacy user profile can lock the replicated legacy profile information and disassociate the replicated legacy profile information from the legacy user profile in the legacy environment. Further, the disassociation of the replicated legacy profile information and the legacy user profile can enable continued access and use of the legacy user profile by the associated user. Accordingly, the conversion environment can be configured to maintain a static data source that represents a conversion-eligible state of the legacy user profile.

In at least one example, the process of locking the legacy user profile for conversion can include locking the replicated legacy profile information and disassociating the replicated legacy profile information from the legacy user profile in the legacy environment. As noted above, the disassociation of the legacy user profile and the replicated legacy profile information can enable continued user access during conversion while maintaining a static and conversion-eligible replica data source for the conversion process. In particular, and after the replicated legacy profile information is locked for conversion, the legacy user profile can be configured to remain accessible to the associated user. Additionally, the legacy user profile can be configured to receive a user modification of the legacy profile information and store modified legacy profile information, generated while the replicated legacy profile information is locked, for reconciliation after the conversion process is complete and the production profile information is generated. Alternatively, or in addition, the legacy user profile can be configured to prevent user modification of the legacy user profile during conversion of the replicated legacy profile information to the production profile information. Accordingly, the replicated legacy profile information can be locked by the conversion environment to maintain a conversion-eligible state while the legacy user profile can be configured to be locked and/or store user modifications for later reconciliation with the production user profile.

In at least one additional example, the process of locking the legacy user profile for conversion can include locking the legacy user profile and preventing user access to and/or modification of the legacy user profile. In particular, the conversion environment can be configured to cause the legacy environment to lock the legacy user profile to substantially reduce and/or prevent deviations between the legacy profile information associated with the legacy user profile in the legacy environment and the replication legacy profile information associated with the conversion environment. Additionally, locking the legacy user profile can include substantially preventing the user associated with the legacy user profile from modifying the legacy profile information and/or from accessing the legacy user profile during the conversion process. Accordingly, the user associated with the legacy user profile can be at least partially prevented from interacting with the legacy user profile during the conversion process.

At block 320, the conversion process can initiate data mapping for the legacy profile information obtained by the conversion environment from the legacy user profile. In particular, the data mapping can be substantially similar to the data translation discussed by FIG. 1 and FIG. 2. Additionally, upon completion of data mapping and the technical eligibility check, conversion of the legacy profile data to generate the production profile data can be initiated. Further, at block 322, the legacy profile data can be converted and the production profile data generated from the legacy profile data. The conversion of the legacy profile data to the production profile data can be substantially similar to the data conversion discussed by FIG. 1 and FIG. 2.

At block 324, a pre-load conversion event can occur in preparation for injection of the production user profile and the production profile information into the production environment. In particular, the conversion environment can initiate initial signaling with the production environment and a parallel system before injection of the production user profile into the production environment. Additionally, the pre-load conversion event can initialize the production user profile within the production profile database. Further, the pre-load conversion event can identify one or more first systems within the production environment that are substantially equivalent to one or more second systems, associated with the legacy user profile, within the legacy environment. More specifically, the legacy user profile can be associated with the one or more second systems such that the legacy user profile receives one or more services via the one or more second systems. For example, the one or more second systems can include a voicemail system, a network tethering system (e.g., enables associated user devices to access network and internet services via the legacy user profile), a payment system, and/or other related systems that the user associated with the legacy user profile gains access to via the legacy user profile. Accordingly, the pre-load conversion event can include the conversion environment identifying the one or more second systems based at least on the legacy profile information, determining the one or more first systems that provide substantially equivalent services, and transmit an indication of that generates an association between the production user profile and the one or more first systems.

At block 326, the production profile information generated by the conversion process can be injected and/or otherwise provided to the production environment. As noted above, the conversion environment can be configured to initialize the production user profile within the production profile database and establish data structure within the production profile database for populating the production user profile with the production profile information. In particular, after the conversion from legacy profile information to production profile information and generation of the production user profile in the production environment (e.g., production profile database), the conversion environment can be configured to populate the production user profile with the production profile information. For example, the production user profile can be populated with user information, user access information (e.g., username, password, authentication methods, etc.), payment information, subscription information, historical user data, and other information that was converted from the legacy profile information to generate the production profile information. Accordingly, the production user profile can be generated within the production environment with minimal production environment downtime.

At block 328, the conversion environment and/or the production environment can perform a conversion audit of the production user profile and the production profile information generated from the legacy user profile. In particular, the conversion audit can be performed by the conversion coordinator and/or an associated system to determine whether the legacy profile information has been converted to the production profile information such that the production user profile can access production environment service(s) and utilize full functionality of a production profile (e.g. the production user profile) within the production environment. Additionally, the conversion audit can identify conversion errors and/or issues prior to enablement of the production user profile. The conversion coordinator can be configured to resolve the conversion error and/or flag the conversion error for manual resolution (e.g., flag conversion error for administrator associated with the conversion process to resolve). Accordingly, the production profile information can be audited and detected conversion errors resolved prior to enablement of the production user profile within the production environment.

In some additional examples, the production user profile can be enabled and the user associated with the legacy user profile transferred to the production user profile. In particular, the legacy user profile can be deleted, discontinued, and/or otherwise disassociated with the legacy environment and the user can be associated with the production user profile for ongoing service utilization. Additionally, the production user profile can be updated to include additional legacy profile information where the legacy user profile remained active during the conversion process and the user submitted modified legacy profile information. Accordingly, the production user profile can be enabled for the associated user and for service within the production environment.

In some further examples, the production user profile can be enabled and provided a bridge to legacy environment services. In particular, the legacy environment can be associated with services, utilized by the legacy user profile, that are unassociated with a substantially equivalent service in the production environment. Additionally, the production user profile can be populated with a set of the legacy profile data that enables a bridge between the production environment and the services provided by the legacy environment such that the production user profile can continue access to the services after enablement. Accordingly, the user associated with the production user profile can continue utilization of legacy environment specific service(s). It should be noted that the continued utilization of the legacy environment specific service(s) can be later discontinued and/or transitioned to the production environment where an equivalent service is established within the production environment.

Figure 4:
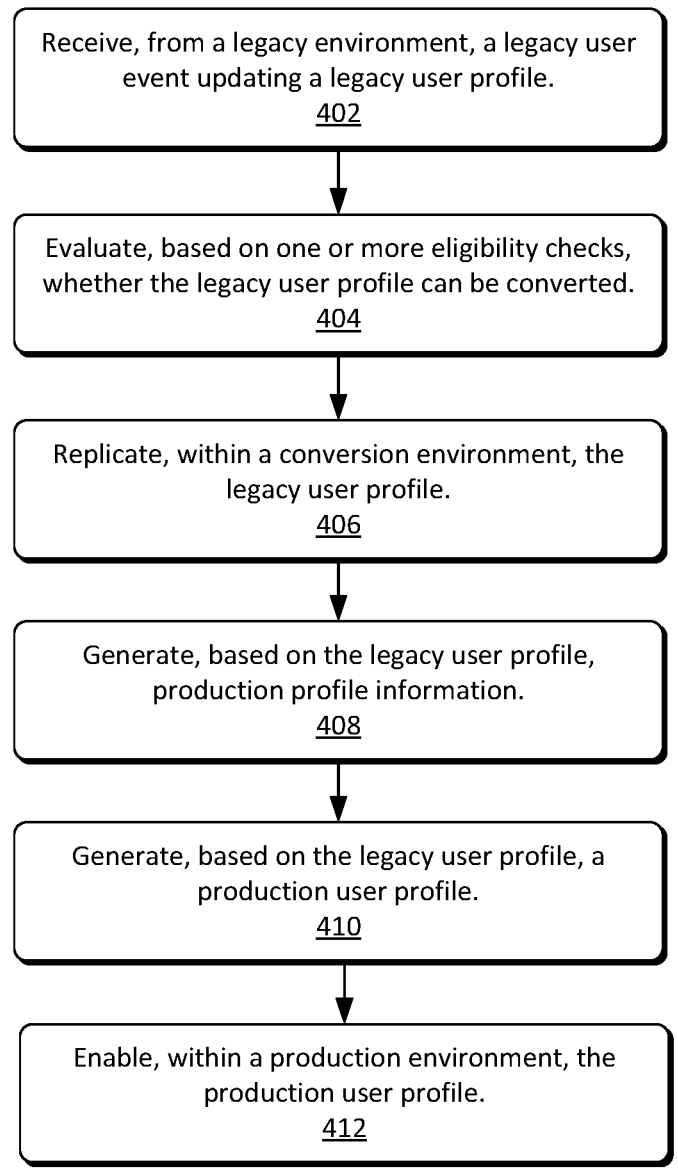
FIG. 4 illustrates a flow diagram of a conversion environment that is configured to identify conversion-eligible legacy user profiles and convert the legacy user profiles from a legacy environment to a production environment.

FIG. 4 illustrates a flow diagram of a conversion environment configured to identify conversion-eligible legacy user profiles and convert the legacy user profiles from a legacy environment to a production environment. In particular, the conversion environment can be configured to provide streamed conversion of the legacy user profiles to generate the production user profiles. More specifically, the conversion environment can identify, in substantially real-time, a conversion-eligible legacy profile and convert the legacy user profile into a production user profile. Accordingly, conversion of individual legacy user profiles into production user profiles can be substantially independent of the conversion of other legacy user profiles.

At block 402, a conversion environment can receive an indication of a legacy user event that updates a legacy user profile. In some examples, the legacy user event can include a change in subscription plan, a change in payment plan, purchase of a user device, a change from a first user device to a second user device, an update to legacy profile information, and/or other modifications to the legacy user profile. In particular, the conversion coordinator can be configured to monitor and/or cause an eligibility engine to monitor the legacy user profiles associated with the legacy environment for indications and/or notifications of the legacy user event. Additionally, the conversion coordinator can be configured to detect one or more indications published by the legacy user profile and/or the legacy environment upon completion of the legacy user event. Further, and based at least on detecting publication of the one or more indications (or being notified that the indication was published), the conversion coordinator can be configured to initiate evaluation and/or cause the eligibility engine to determine whether the legacy user profile associated with the legacy user event is in a conversion-eligible state. Accordingly, the conversion coordinator (or the eligibility engine) can be in communication with the legacy environment and identify legacy user events that alter the legacy profile information associated with the legacy user profiles of the legacy environment.

At block 404, the conversion environment can evaluate the legacy user profile against one or more eligibility checks to determine whether the legacy user profile can be converted into a production user profile. In some examples, the conversion environment can cause the legacy user profile to be evaluated by the eligibility engine associated with the legacy environment and/or the conversion environment. In particular, the conversion environment can cause the eligibility environment to evaluate the conversion eligibility of the legacy user profile based at least on the detection of the legacy user event and determining that the legacy user event included a modification to the legacy user profile. Additionally, and as noted above, the eligibility engine can utilize the legacy profile information to determine whether the legacy user profile can be converted to a production user profile. Further, the eligibility engine can transmit an indication to the conversion coordinator indicating that the legacy user profile is conversion-eligible or conversion-ineligible.

In at least one example, the eligibility engine can transmit an indication to the conversion coordinator that the legacy user profile is conversion-eligible. In particular, the eligibility engine can be configured to analyze/parse the legacy profile information associated with the legacy user profile and determine that the legacy profile information can be converted to production profile information. Additionally, the eligibility engine can be configured to generate the indication of conversion eligibility and transmit the indication to the conversion coordinator. Accordingly, the eligibility engine can be configured to identify conversion eligible legacy user profiles in response to an eligibility check request received from the conversion coordinator (or from detecting the legacy user event) and transmit the indication of conversion eligibility in response to the eligible check request.

In at least one additional example, the eligibility engine can transmit an indication to the conversion coordinator that the legacy user profile is conversion-ineligible. In particular, the eligibility engine can be configured to analyze/parse the legacy profile information associated with the legacy user profile and determine that the legacy profile information is conversion-ineligible. Additionally, the eligibility engine can be configured to determine the legacy profile information that resulted in the conversion-ineligible determination and generate a legacy profile issue that indicates source information for the conversion-ineligible determination. Further, the eligibility engine can be configured to generate the indication of conversion ineligibility and transmit the indication with the legacy profile issue to the conversion coordinator. Alternatively, or in addition, the eligibility engine can be configured to publish the indication of conversion ineligibility such that a system configured to resolve the legacy profile issue associated with the indication can detect the indication and resolve the legacy profile issue. It should be noted that while the conversion coordinator is described as a central communication hub for the transmission of indications, the eligibility engine can transmit the indication and/or the legacy profile issue directly to the system configured to resolve the legacy profile issue. Accordingly, the eligibility engine can be configured to identify conversion ineligible legacy user profiles in response to an eligibility check request received from the conversion coordinator (or from detecting the legacy user event) and transmit the indication of conversion ineligibility in response to the eligible check request.

At block 406, the conversion environment can be configured to replicate the legacy user profile within the conversion environment. It should be noted that the conversion environment can be configured to replicate and/or receive a replica of the legacy user profile in response to an indication of conversion eligibility being associated with the legacy user profile (e.g., by an eligibility engine and/or a conversion coordinator). Additionally, the conversion environment can be configured to initiate replication of the legacy user profile and/or the legacy profile information in response to a determination, by the eligibility engine, that the legacy user profile is conversion eligible.

In at least one example, the legacy environment can be configured to provide the legacy user profile for replication into the conversion environment. In particular, the eligibility engine can cause the legacy environment, or a system associated with the legacy environment, to initiate replication of the legacy user profile via a data replication system. More specifically, the eligibility engine can publish the indication of conversion eligibility associated with the legacy user profile and/or transmit a replication request in response to determining that the legacy user profile is conversion eligible. Additionally, the legacy environment can determine that the indication of conversion eligibility was published and/or receive the replication response. Further, in response to the indication and/or the replication response, the legacy environment can be configured to cause a legacy profile database to transmit legacy profile information associated with the legacy profile to the data replication system and cause a replica data source to be generated for the conversion environment.

In at least one additional example, the conversion environment can be configured to obtain the legacy user profile for replication into the conversion environment. In particular, the eligibility engine can cause the conversion environment, or a system associated with the conversion environment, to initiate replication of the legacy user profile via a data replication system. More specifically, the eligibility engine can publish the indication of conversion eligibility associated with the legacy user profile and/or transmit a replication request in response to determining that the legacy user profile is conversion eligible. Additionally, the conversion environment can determine that the indication of conversion eligibility was published and/or receive the replication response. Further, in response to the indication and/or the replication response, the conversion environment can be configured to obtain the legacy profile information from the legacy environment and/or cause a replica data source to be generated for the conversion environment.

In at least one further example, the conversion coordinator can be configured to transfer the legacy user profile to the conversion environment for replication. In particular, the conversion coordinator can receive the indication of conversion eligibility for the legacy user profile and cause replication of the legacy user profile via a data replication system. More specifically, the conversion coordinator can detect that the indication of conversion eligibility was published and/or receive the indication of conversion eligibility from the eligibility engine. Additionally, the conversion coordinator can cause the legacy environment to provide the legacy profile information (and/or the legacy user profile) to the conversion coordinator and/or the data replication system associated with the conversion environment. Further, the conversion coordinator can provide or cause the legacy user information to be provided to the data replication system and cause a replica data source to be generated/provided for the conversion environment.

At block 408, the conversion environment can be configured to generate production profile information from legacy profile information associated with the legacy user profile. In particular, the conversion environment can be configured to utilize the replica data source to generate the production profile information. Additionally, a translation template can be utilized to convert the legacy profile information to the production profile information. The translation template can be generated by the conversion environment based on the legacy profile information and by mapping one or more portions of the legacy profile information for conversion to the production environment. Accordingly, the conversion environment can determine one or more additional portions of the production profile information that correspond to the one or more portions of the legacy profile information and generate the translation template for converting the one or more portions into the one or more additional portions.

At block 410, the conversion environment can be configured to generate the production user profile by populating a profile template with the production profile information. In particular, the production profile information can be mapped to the profile template based at least on the translation template generated by the conversion environment. Additionally, the conversion environment can generate the production profile information from the legacy profile information and then generate a production user profile based at least on the production user profile and the profile template. Further, the production user profile can be injected into a production account database associated with the production environment. It should be noted that the production user profile can be injected in the production environment upon completion of the legacy profile information to the production profile information. Alternatively, or in addition, the profile template can be injected into the production account database and populated with the production profile information as the legacy profile information is converted into the production profile information by the conversion environment. Accordingly, the production user profile can be generated by the conversion environment, populated with the production profile information, and injected into the production environment during normal operations of the production environment (e.g., the production environment does not have to be taken offline, disabled, or be otherwise made unavailable to a plurality of production users).

At block 412, the conversion environment can be configured to enable the production user profile within the production environment. In particular, the conversion environment can transmit an indication that the production user profile has been generated and/or injected into the production profile database. Alternatively, or in addition, the conversion environment can be configured to publish the indication that the production user profile has been generated and/or injected into the production profile database. Accordingly, the transmission (or publication) of the indication can trigger the transfer of the user from the legacy environment to the production environment, the disassociation of the user from the legacy user profile (excluding some residual services not provided by the production environment or that remain provided through the legacy environment), and the enablement of the production user profile for the user.

Figure 5:
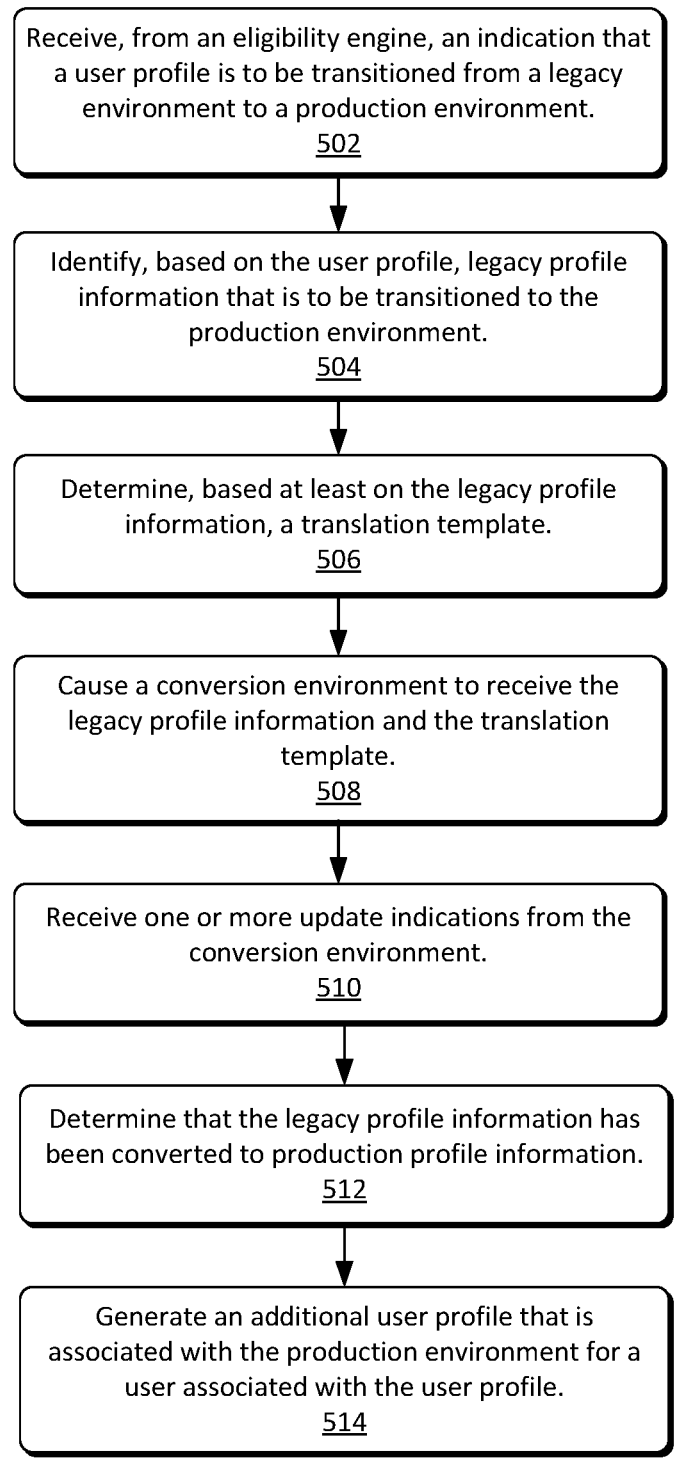
FIG. 5 illustrates a flow diagram executed by a conversion coordinator configured to manage a conversion environment during conversion of a user profile from a legacy environment to a second environment.

FIG. 5 illustrates a flow diagram executed by a conversion coordinator configured to manage a conversion environment during conversion of a user profile from a legacy environment to a second environment. In some examples, the conversion coordinator is a central management system that is configured to monitor at least the legacy environment, the eligibility engine, the conversion environment, the production environment, and/or other systems associated with the conversion environment.

At block 502, the conversion coordinator can receive an indication, from an eligibility engine, that a user profile is to be transitioned from the legacy environment to the production environment. In particular, the conversion coordinator can receive an indication that the user profile has satisfied one or more eligibility checks that are associated with the eligibility engine. Additionally, the conversion coordinator can receive an additional indication that an additional user profile has failed to satisfy the one or more eligibility check and is associated with one or more eligibility issues. Accordingly, the conversion coordinator can be configured to track an eligibility status for the user profile and the additional user profile.

In some examples, the conversion coordinator can be configured to determine that the eligibility engine published an indication that the user profile has satisfied the one or more eligibility checks. Additionally, the conversion coordinator can determine, based at least on the publication of the indication, that the indication includes identifying information associated with the user profile. The identifying information can enable the conversion coordinator to identify the user profile within a legacy profile databased and initiation conversion of the user profile from the legacy environment to a production environment. Accordingly, the conversion coordinator can be configured to initiation conversion of the legacy user profile in response to a received indication of eligibility or in response to detecting a published indication within the message/event-based architecture of a network.

In some examples, the eligibility status can be configured to display a first status for legacy user profiles that have satisfied the one or more eligibility checks (e.g., a green light, a check mark, or other indicator of satisfaction for the one or more eligibility checks). Similarly, the eligibility status can be configured to display a second status or a third status for legacy user profiles that are associated with one or more eligibility issues (e.g., a yellow light, an empty circle, or other indicator of partial satisfaction of the one or more eligibility checks when the conversion coordinator/associated systems are capable of resolving the one or more eligibility issues or a red light, a cross, or other indicator of failed satisfaction of the one or more eligibility checks when manual intervention is to be requested). For example, the second status can be displayed for the legacy user profiles that are missing information and the conversion coordinator can be configured to resolve the eligibility issue by requesting the customer provide the missing information. In comparison, and in another example, the third status can be displayed for the legacy user profiles that are associated with a subscription that does not have an associated equivalent within the production environment. Accordingly, the conversion coordinator can transmit the third status to a marketing department or an administrator to enable transmission of promotions and/or other incentives to change the subscription associated with the legacy user profiles.

At block 504, the conversion coordinator can identify legacy profile information associated with the user profile and cause the legacy profile information to be transitioned to the production environment. As noted above, the conversion coordinator can be configured to receive the legacy user profile and/or cause the legacy user profile to be replicated within the conversion environment. In particular, the conversion coordinator can be configured to cause a data replication system to access a legacy profile database associated with the legacy environment, extract the legacy profile information associated with the user profile, and replicate the legacy profile information to generate a replica data source within the conversion environment.

At block 506, the conversion coordinator can be configured to determine a translation template for the legacy profile information. In some examples, the translation template can be identified based at least on the legacy profile information associated with the user profile and the legacy environment. More specifically, the legacy profile information can be utilized to identify data format, profile services, and other associated information within the legacy environment and equivalent information associated with the production environment. Additionally, the translation template can be utilized to map the legacy profile information onto the production services and production data formats that are to be associated with the production user profile. Accordingly, the translation template can be generated to enable the conversion environment to receive the legacy profile information and generate the production profile information that can be mapped to production services that are substantially equivalent to the legacy services and production data formats associated with the production services.

At block 508, the conversion coordinator can be configured to cause a conversion environment to receive the legacy profile information and the translation template. As noted above, the conversion coordinator can be configured to route profile information and association conversion data between individual systems of the legacy environment, the conversion environment, and/or the production environment. Additionally, the conversion coordinator can be configured to detect and/or monitor outputs of the individual systems of the legacy environment, the conversion environment, and/or the production environment to determine whether additional information is to be provided and/or whether the output information is to be redirected to another system. Accordingly, the conversion coordinator can cause the conversion environment to progress the conversion of the user profile from the legacy environment to the production environment via the routing of the legacy profile information, the translation template, and other information within the conversion environment.

At block 510, the conversion coordinator can be configured to receive one or more update indications from the conversion environment. For example, the conversion coordinator can be configured to receive update indications from a data replication system (e.g., data replication system 204), a technical eligibility check (e.g., eligibility check 210), an eligibility report (e.g., eligibility report 212), a production database check (e.g., production database check 216), a data injection system (e.g., a system that performs data injection 218), and other systems of the conversion environment that provide updates regarding the conversion of the user profile from the legacy environment to the production environment. Additionally, the update indications can include additional indications of requested actions such as additional information requests, user profile action requests (e.g., lock access to legacy environment, enable the user profile within production environment, etc.), intervention requests, and other requests that are utilized to progress the conversion process and/or resolve conversion process issues. Accordingly, the update indications can enable the conversion coordinator to resolve some conversion process issues, route the update indication to an administrator for manual resolution, and/or monitor the conversion of the user profile from the legacy environment to the production environment.

At block 512, the conversion coordinator can be configured to determine that the legacy profile information has been converted to production profile information.

At block 514, the conversion coordinator can be configured to cause an additional user profile to be generated within the production environment for the user associated with the user profile. determining that the additional user profile has been configured for utilization within the production environment; determining, based at least on the production profile information, that the user profile has been utilized to generate the additional user profile; and enabling the additional user profile within the production environment.

Figure 6:
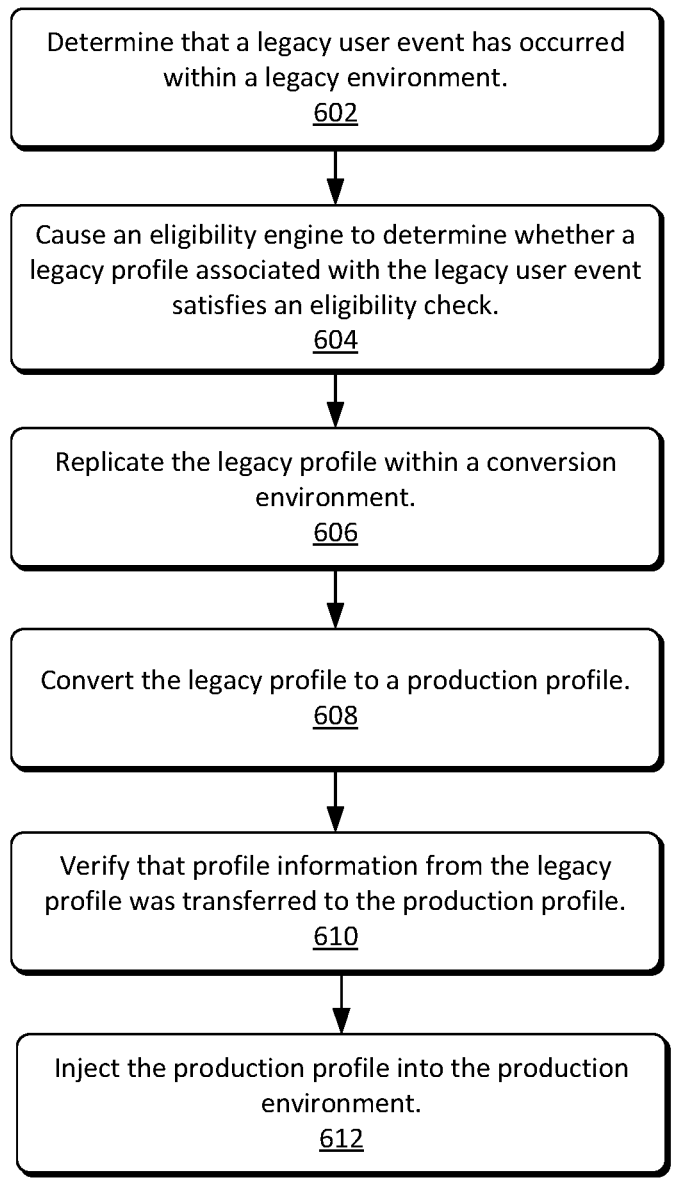
FIG. 6 illustrates a flow diagram executed by a conversion environment during conversion of a user profile from a legacy environment to a second environment for streaming conversion of a plurality of user profiles.

FIG. 6 illustrates a flow diagram executed by a conversion environment during conversion of a user profile from a legacy environment to a second environment for streaming conversion of a plurality of user profiles.

At block 602, the conversion environment can be configured to determine that a legacy user event has occurred within a legacy environment. In some examples, the conversion environment can be configured to monitor a plurality of legacy user profiles that are associated with the legacy environment. Additionally, one or more legacy user profiles of the plurality of legacy user profiles can perform a legacy user event that modifies the one or more legacy user profiles. As noted above, the legacy user event can trigger an evaluation of the one or more legacy user profiles to determine whether the one or more legacy user profiles are conversion-eligible. Further, the legacy user event associated with the one or more legacy user profiles can cause the conversion environment to generate a conversion queue for the one or more legacy user profiles. Accordingly, the conversion environment can (or have an associated system such as the conversion coordinator) identify the one or more legacy user profiles based at least on the legacy user event.

At block 604, the conversion environment can cause an eligibility engine to determine whether a legacy profile associated with the legacy user event is conversion-eligible. As noted above, the evaluation by the eligibility engine can be triggered by the legacy user event and/or a system associated with the conversion environment that detects the legacy user event. In particular, the legacy profile can be an individual legacy user profile of the one or more legacy user profile and can be associated with the legacy user event. Further, the legacy profile can be identified to the eligibility engine based at least on detection of the legacy user event(s) associated with the legacy profile. Additionally, the eligibility engine can be configured to access the legacy environment and determine whether legacy profile information associated with the legacy profile satisfies one or more eligibility checks. The evaluation of the legacy profile and the one or more legacy user profiles can be performed continuously, periodically, aperiodically, and/or in substantially real-time as the one or more legacy user profiles generate the legacy user event(s). Accordingly, the eligibility engine can receive a stream of the one or more legacy user profiles, determine whether the one or more legacy user profiles are conversion eligible, and sort the one or more legacy user profiles into categories based at least on actions that can be executed for the one or more legacy user profiles.

In some examples, and as noted above, the one or more legacy user profiles can be sorted into categories of conversion-eligible, resolvable eligibility issues, and manual intervention profile categories. Additionally, the resolvable eligibility issues and manual intervention profile categories can be removed from the conversion queue pending resolution of the eligibility issues. Further, the eligibility issues can be resolved by the user associated with a user profile, by a system associated with the eligibility engine and/or the conversion environment, and/or by an administrator associated with the legacy environment and/or the conversion environment. Accordingly, conversion eligible user profiles can be provided to the conversion environment for conversion to production user profile(s).

At block 606, the conversion environment can be configured to replicate the legacy profile to generate a reference data source. As noted above, the conversion environment can include and/or be associated with a data replication system that is configured to replicate the legacy profile within the conversion environment by requesting legacy profile information from a legacy account database associated with the legacy environment. Additionally, the legacy profile information is replicated within the conversion environment to create a reference data source for utilization by the conversion environment while converting the legacy profile to a production profile. The replication of the one or more legacy profiles that have been identified as conversion eligible can occur substantially continuously, periodically, aperiodically, and/or in substantially real-time as the one or more legacy profiles are identified by the conversion environment and/or the eligibility engine as conversion eligible. Accordingly, the legacy profile(s) that has been identified as conversion eligible can be replicated for conversion within the conversion environment and maintain coherence of the legacy profile within the legacy environment.

At block 608, the conversion environment can convert the legacy profile to a production profile. In particular, the conversion environment can utilize the translation template and data mapping provided by an internal system and/or a conversion coordinator to extract profile data from the reference data source and translate the profile data into a format that can be utilized by the production environment and utilize the profile data to populate a profile template associated with the production environment. Additionally, the legacy services associated with the user profile can be utilized to identify substantially equivalent production services associated with the production environment. The service association can enable the conversion environment to configure production service information for the user profile such that after the conversion from the legacy environment to the production environment includes transition of the user profile from the legacy services to the production services. Accordingly, the legacy profile can be converted to the production profile, wherein the production profile can be populated with production profile information that maintains service access for the associated user and profile functionality between the legacy environment and the production environment.

At block 610, the conversion environment can verify that profile information from the legacy profile has been transferred to the production profile. In particular, and after the production profile is generated, the conversion environment can be configured to confirm functionality within the production environment. For example, the production environment can be configured to ensure that an associated user is able to access the production profile, utilize substantially equivalent services via the production profile, and complete transactions via the production profile.

At block 612, the conversion environment can inject the production profile into the production environment. In particular, the conversion environment can cause the legacy profile to be locked and/or disassociated from the associated user and enable the production profile within the production environment. Additionally, the conversion environment can cause the production profile to be injected into the production environment upon completion of the conversion/verification process while the production environment maintains service and operation of a plurality of production profiles. Further, the locking/disassociation of the legacy profile can be performed at the initiation of the conversion process, during the conversion process, or after the injection of the production profile into the production environment. Accordingly, the conversion environment can be configured to minimize user profile downtime while transitioning the associated user from the legacy environment to the production environment.

It should be noted that while FIGS. 1, 2, 3, 4, 5, and 6 discuss various examples that include operations and steps being performed in an order, any of the above operations/steps can be performed in any order by the described systems. Similarly, individual operations can be omitted and/or combined in any fashion. Additionally, while individual functionality of the above examples is associated with a component and/or system, any of the above components and/or systems can provide any of the functionality described above. Accordingly, the above operations can be performed by any of the above components and can be combined in any fashion.

Figure 7:
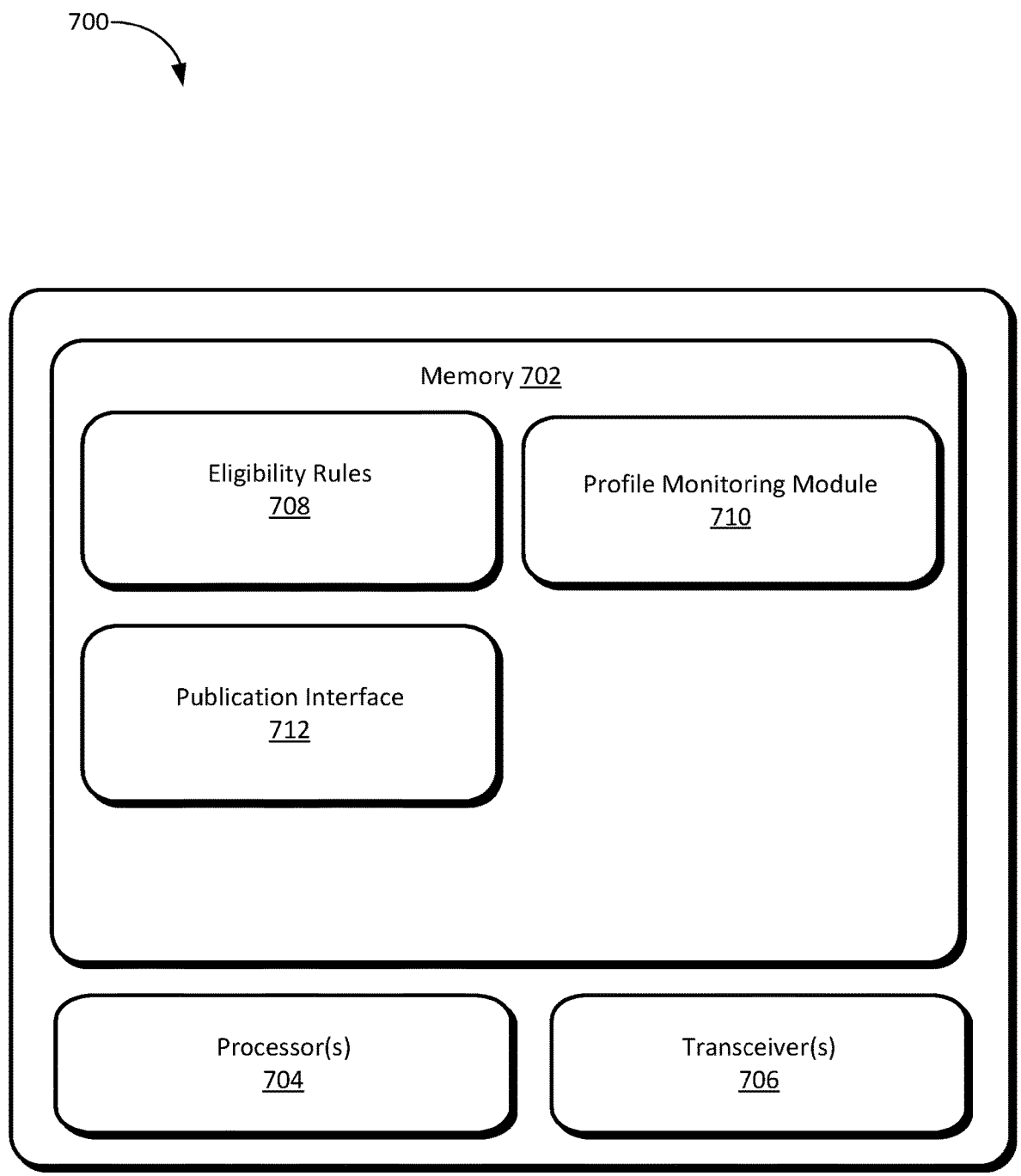
FIG. 7 illustrates a block diagram of an eligibility engine capable of implementing the methods disclosed herein, in accordance with some examples of the present disclosure.

FIG. 7 illustrates a block diagram of an eligibility engine capable of implementing the methods disclosed herein, in accordance with some examples of the present disclosure. In some examples, the eligibility engine 700 can correspond to any of the eligibility engines and/or eligibility systems discussed in FIGS. 1, 2, 3, 4, 5, and 6. As illustrated, the eligibility engine 700 is generally comprised of memory 702, one or more processors 704, and one or more transceivers 706.

In some examples, the memory 702 is volatile (such as RAM), non-volatile (such as ROM, flash memory, etc.) or some combination of the two. The memory 702 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that can be accessed by the eligibility engine 700. Additionally, the memory 702 can comprise one or more instructions that are executed by the processors 704 and cause the processors 704 to perform operations of the methods discussed above. Further, the memory 702 can comprise additional modules that can be executed by the processors 704 and cause the processors 704 to perform additional operations associated with the eligibility engine 700. The additional modules can comprise eligibility rules 708, profile monitoring module(s) 710, a publication interface 712, and other modules.

In some examples, the processors 704 can include one or more central processing units (CPUs), one or more graphics processing units (GPUs), both CPUs and GPUs, or other processing units or components known in the art.

In some examples, the transceivers 706 can include one or more wired or wireless transceivers. For example, the transceivers 706 can include a network interface card, a network adapter, a LAN adapter, an address associated with a network connection, or another device permitting communications to be sent and received. Additionally, the transceivers 706 can comprise any wireless transceiver capable of engaging in wireless, radio frequency (RF) communication. Further, the transceivers 706 can include additional wireless modems, such as Wi-Fi, WiMax, Bluetooth, and/or infrared communication modems.

In some additional examples, the transceivers 706 can be configured to transmit communications via Internet-based communication networks, 3G networks, 4G networks, 5G network, intra-nets associated with various operating environments (e.g., legacy environment, conversion environment, production environment, etc.) and other communication networks. Internet-based communication networks can include networks that utilize the Internet of Things, provided by Internet Service Providers, that interconnect various user devices and enable signals to be freely transmitted between the various user devices. Additionally, Universal Mobile Telecommunication Systems (UMTS) is an example of a 3G network, although there are other 3G network infrastructures that may implement the following methods and systems. Long Term Evolution (LTE) and Evolved High-Speed Packet Access (HSPA+) are examples of 4G networks, although there are other 4G network infrastructures that may implement the following methods and systems. 5G networks are the next generation of mobile networks that are designed to combine both an evolution and revolution of the existing LTE/LTE-A mobile networks.

In some examples, the instructions stored by the memory 702 can cause the processors 704 and the transceivers 706 to perform operations that comprise the methods and signaling processes discussed above. These operations can include, but are not limited to, identifying conversion eligible legacy user profiles and flagging the conversion eligible legacy user profiles for transfer to the conversion environment.

In some examples, the eligibility rules 708 can comprise one or more rules for determining the eligibility of a legacy user profile for conversion to a production user profile. In particular, the eligibility rules 708 can include rules that confirm the storage of legacy profile information in a conversion eligible data format, that the legacy user profile is associated with a user device that is compatible with the production environment, that the legacy user profile is associated with a subscription that is associated with a substantial equivalent within the production environment, and/or other eligibility rules that are configured to confirm conversion eligibility. Additionally, the eligibility rules 708 can be configured to associate resolution actions with the individual eligibility rules such that eligibility issues can be associated with actionable steps for resolving the eligibility issue and moving the legacy user profile towards conversion. The resolution actions can include notifying the user associated with the legacy user profile that additional information is to be provided, causing a conversion coordinator to implement the resolution action, scheduling an additional eligibility determination for the legacy user profile, and/or elevating the eligibility issue for manual intervention by an administrator. Accordingly, the eligibility rules 708 can enable the eligibility engine to identify and flag legacy user profiles for conversion to production user profiles.

In some examples, the profile monitoring module 710 can comprise an interface with a legacy profile database that is configured to detect modifications that have been applied to legacy user profiles associated with the legacy environment. In particular, the profile monitoring module 710 can enable the eligibility engine to detect modifications to the legacy user profile in substantially real-time (or periodically/aperiodically/continuously) and queue modified legacy user profiles for eligibility determinations via the eligibility rules 708. Accordingly, modifications to the legacy user profiles can be detected and utilized to flag individual legacy user profiles for potential conversion.

In some examples the publication interface 712 can comprise an interface to an operating environment associated with the eligibility engine, a conversion coordinator, individual systems of the conversion environment, and/or other systems such that systems that are configured to respond to an indication are able to detect the indication and execute the associated function. In particular, the eligibility engine can utilize the publication interface 712 to publish indications of conversion eligibility and/or conversion ineligibility for individual legacy user profiles such that other systems (e.g., a conversion coordinator and/or a data replication system) can detect the indications of conversion eligibility and/or conversion ineligibility and trigger appropriate responses to the indications. For example, publication of the indication of conversion eligibility can cause the conversion coordinator to transmit the legacy user profile associated with the indication to the data replication system. Similarly, publication of the indication of conversion ineligibility can cause the conversion coordinator to transmit the legacy user profile to the appropriate destination for resolution of the eligibility issue (e.g., customer notification system, administrative notification system, etc.). Alternatively, the publication interface 712 can include an application programming interface (API) that enables systems associated with the conversion process and/or the legacy environment to communicate with the eligibility engine 700. Additionally, the API of the publication information can enable direct interactions (e.g., calls, data provision, requests, etc.) to exchange information and notifications between systems of associated with the conversion process and/or the legacy environment. Accordingly, the publication interface 712 can enable both indirect (e.g., publication and detection) and direct (e.g., systems specific calls, requests, notifications, etc.) communication between the eligibility engine to other systems associated with the legacy environment, production environment, and/or conversion environment.

Figure 8:
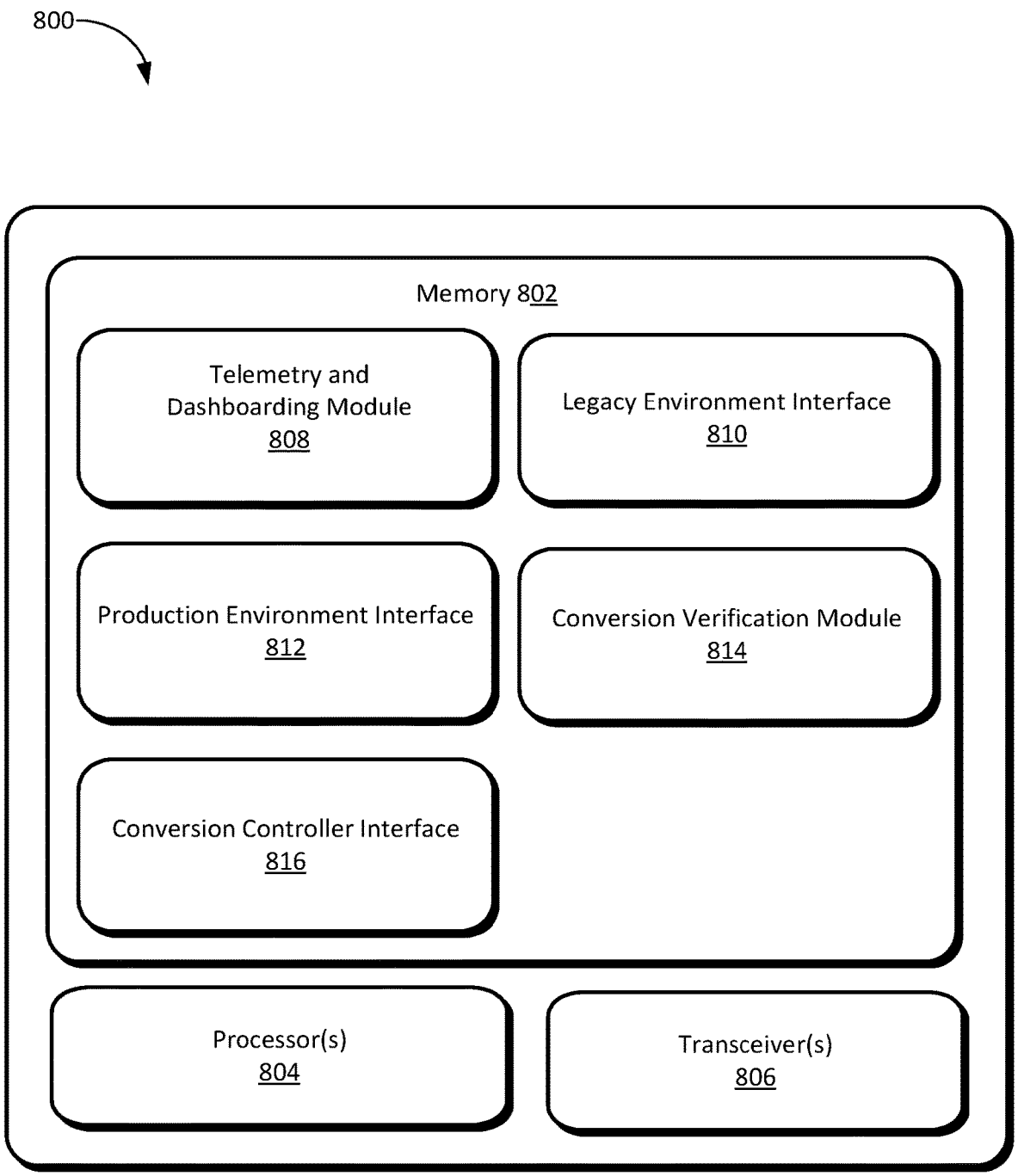
FIG. 8 illustrates a block diagram of a conversion coordinator capable of implementing the methods disclosed herein, in accordance with some examples of the present disclosure.

FIG. 8 illustrates a block diagram of a conversion coordinator capable of implementing the methods disclosed herein, in accordance with some examples of the present disclosure. In some examples, the conversion coordinator 800 can correspond to any of the conversion coordinators discussed in FIGS. 1, 2, 3, 4, 5, and 6. As illustrated, the conversion coordinator 800 is generally comprised of memory 802, one or more processors 804, and one or more transceivers 806.

In some examples, the memory 802 is volatile (such as RAM), non-volatile (such as ROM, flash memory, etc.) or some combination of the two. The memory 802 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that can be accessed by the conversion coordinator 800. Additionally, the memory 802 can comprise one or more instructions that are executed by the processors 804 and cause the processors 804 to perform operations of the methods discussed above. Further, the memory 802 can comprise additional modules that can be executed by the processors 804 and cause the processors 804 to perform additional operations associated with the conversion coordinator 800. The additional modules can comprise a profile monitor telemetry and dashboarding module 808, a legacy environment interface 810, a production environment interface 812, a conversion verification module 814, a conversion controller interface 816, and other modules.

In some examples, the processors 804 can include one or more central processing units (CPUs), one or more graphics processing units (GPUs), both CPUs and GPUs, or other processing units or components known in the art.

In some examples, the transceivers 806 can include one or more wired or wireless transceivers. For example, the transceivers 806 can include a network interface card, a network adapter, a LAN adapter, an address associated with a network connection, or another device permitting communications to be sent and received. Additionally, the transceivers 806 can comprise any wireless transceiver capable of engaging in wireless, radio frequency (RF) communication. Further, the transceivers 806 can include additional wireless modems, such as Wi-Fi, WiMax, Bluetooth, and/or infrared communication modems.

In some additional examples, the transceivers 806 can be configured to transmit communications via Internet-based communication networks, 3G networks, 4G networks, 5G network, intra-nets associated with various operating environments (e.g., legacy environment, conversion environment, production environment, etc.) and other communication networks. Internet-based communication networks can include networks that utilize the Internet of Things, provided by Internet Service Providers, that interconnect various user devices and enable signals to be freely transmitted between the various user devices. Additionally, Universal Mobile Telecommunication Systems (UMTS) is an example of a 3G network, although there are other 3G network infrastructures that may implement the following methods and systems. Long Term Evolution (LTE) and Evolved High-Speed Packet Access (HSPA+) are examples of 4G networks, although there are other 4G network infrastructures that may implement the following methods and systems. 5G networks are the next generation of mobile networks that are designed to combine both an evolution and revolution of the existing LTE/LTE-A mobile networks.

In some examples, the instructions stored by the memory 802 can cause the processors 804 and the transceivers 806 to perform operations that comprise the methods and signaling processes discussed above. These operations can include, but are not limited to, identifying conversion eligible legacy user profiles, transferring profile information between environment/systems, and monitoring conversion of legacy user profiles to production user profiles.

In some examples, the telemetry and dashboarding module 808 can comprise instructions for tracking legacy user profile(s) during conversion from the legacy environment to the production environment. In particular, the telemetry and dashboarding module 808 can be configured to monitor and display a conversion status and/or an eligibility status for one or more legacy user profiles during the conversion process. For example, one or more indicators within a user interface can provide information associated with the eligibility check performed by the eligibility engine, a technical eligibility check performed by the conversion environment, and a production data base check that indicates whether the converted user profile can be progressed within the conversion environment. Additionally, one or more additional indicators within the user interface can provide information associated with the generation of translation templates, mapping data, replication of the legacy user profile, conversion from the legacy user profile to the production user profile, injection of the production user profile, and other steps within the conversion process. The telemetry and dashboarding module 808 can be configured to provide a current status of the conversion process for a legacy user profile, a status of the conversion process that is associated with the one or more legacy user profiles being converted at a point in time, the progress of individual systems within the conversion process, and/or other information associated with the conversion of the legacy user profile(s) to the production user profile(s). Accordingly, the telemetry and dashboarding module 808 can be configured to provide conversion analytics associated with individual user profiles during conversion, the status of individual systems associated with the conversion process, and/or the conversion environment.

In some examples, the legacy environment interface 810 can comprise an interface with one or more systems associated with the legacy environment such as the eligibility engine, a legacy profile database, the conversion coordinator, and/or other systems associated with the legacy environment and the conversion environment. In particular, the legacy environment interface 810 can enable the conversion coordinator to receive information from the legacy environment, transfer indications between systems associated with the legacy environment, transmit information to systems associated with the legacy environment, and otherwise facilitate transfer of the legacy user profile(s) from the legacy environment to the conversion environment.

In some examples, the production environment interface 812 can comprise an interface with one or more systems associated with the production environment such as a data injection system, a production profile database, the conversion coordinator, a production profile verification system, and/or other systems associated with the production environment and the conversion environment. In particular, the production environment interface 812 can enable the conversion coordinator to receive information from the conversion environment, determine that the conversion from legacy user profile to production user profile is complete, transfer indications between systems associated with the production environment, transmit information to systems associated with the production environment, and otherwise facilitate completion of the conversion process and injection of the production user profile into the production environment.

In some examples, the conversion verification module 814 can comprise a set of conversion rules configured to determine whether conversion of the legacy user profile to the production user profile has been completed and whether the production user profile can be injected into the production environment. For example, the conversion verification module 814 can be configured to determine whether the legacy data formats have been converted into the production data formats, determine that the production user profile has been associated with production services that are substantially equivalent to legacy services associated with the legacy user profile, and other verification steps that ensure that the production user profile will be able to operate within the production environment with minimal disruptions for the user associated with the legacy user profile and the production user profile. Accordingly, the conversion verification module 814 can be utilized to confirm that the legacy user profile has been successfully conversion and initiate the injection/enablement of the production user profile within the production environment.

In some examples, the conversion controller interface 816 can comprise an interface configured to enable control over conversion variables such as conversion rate for legacy user profiles, throughput rates for individual systems of the conversion process (e.g., data replicator, data convertor, etc.), and other variables associated with control of the conversion process. Additionally, the conversion controller interface 816 can enable one or more controls for the conversion process. More specifically, the conversion controller interface 816 can enable initiating the conversion process, stopping the conversion process, aborting the conversion of one or more legacy user profiles, determining an intervention action for the conversion process, and other controls that can be triggered manually by an administrator and/or automatically in response to a detected conversion issue. In particular, the conversion controller interface 816 can enable both manual control actions (e.g., initiating the conversion process, stopping the conversion process, limiting conversions that occur per unit time, etc.) and automated control actions (e.g., detecting abnormal operation and/or conversion, aborting abnormal conversions, etc.). Further, the conversion controller interface 816 can be configured to receive an indication of a control action and enable the conversion coordinator (or other system associated with the conversion process) to implement the control action during operation of the conversion environment. Accordingly, the conversion controller interface 816 is configured to implement control actions for the conversion process based on manually submitted indications and/or detected operating parameters that indicate a control action is to be executed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from a legacy environment, a legacy user event updating a legacy user profile associated with the legacy environment;
determining that the legacy user profile satisfies one or more eligibility checks;
causing, based at least on the one or more eligibility checks, the legacy user profile and legacy profile information to be replicated within a conversion environment;
generating, based at least on the legacy profile information, production profile information associated with the legacy user profile;
generating, based at least on the legacy user profile, a production user profile populated with the production profile information within the conversion environment;
loading the production user profile into a production environment; and
transitioning, from the legacy environment to the production environment, service associated with the legacy user profile to the production user profile and from the legacy environment to the production environment.

2. The method of claim 1, wherein:
the legacy environment is a live legacy environment that is configured to process legacy user requests and legacy user actions received from the legacy user profile and one or more additional legacy profiles; and
the production environment is a live operating environment that is configured to process user requests and user actions within the production environment.

3. The method of claim 2, wherein causing the legacy user profile and the legacy profile information to be replicated within the conversion environment further comprises:
determining, based at least on the one or more eligibility checks, that the legacy profile information includes one or more data fields that are associated with a user profile translation template;
preventing one or more additional update events associated with the legacy user profile and the legacy profile information;
copying the legacy user profile and the legacy profile information to be replicated within the conversion environment; and
providing, based at least on the one or more eligibility checks, the user profile translation template configured to convert the legacy profile information to the production profile information.

4. The method of claim 2, wherein loading the production user profile into the production environment further comprises:
determining, based at least on one or more conversion checks, that the production user profile has been generated based at least in part on the legacy user profile;
generating a profile template within a user information database associated with the production environment; and
populating, based at least on the production user profile, the profile template with the production profile information.

5. The method of claim 2, wherein transitioning the service associated with the legacy user profile to the production user profile further comprises:
determining that the production user profile has been created within the production environment and has been populated with the production profile information;
determining that a username, a password, and user access information associated with the legacy user profile is to be transitioned from the legacy environment to the production environment;
discontinuing the service for the legacy user profile via the legacy environment;
converting the username, the password, and the user access information to the production user profile; and
enabling the service for the production user profile via the production environment.

6. The method of claim 1, wherein determining that the legacy user profile satisfies the one or more eligibility checks further comprises:
identifying, based at least on the legacy environment, a plurality of legacy user profiles that have received user profile updates;
determining, based at least on the user profile updates, the legacy user profile and one or more additional legacy user profiles that satisfy the one or more eligibility checks; and
causing, in substantially real time, the legacy user profile and the one or more additional legacy user profiles to be converted into a plurality of production user profiles.

7. A system comprising:
one or more processors; and
a memory that includes one or more computer-executable instructions that cause the processors to perform operations comprising:
receiving, from an eligibility engine, an indication that a user profile is to be transitioned from a legacy environment to a production environment;
identifying, based at least on the user profile, legacy profile information that is to be transitioned to the production environment;
determining, based at least on the legacy profile information and the indication, a translation template;
causing the legacy profile information and the translation template to be provided to a conversion environment;
receiving one or more update indications from the conversion environment;
determining, based at least on the one or more update indications, that the legacy profile information has been converted to production profile information; and generating, based at least on the production profile information, an additional user profile that is associated with the production environment for a user associated with the user profile.

8. The system of claim 7, wherein receiving the indication that the user profile is to be transitioned further comprises:
   determining that the eligibility engine published the indication and that the indication includes identification information associated with the user profile;
   identifying, based at least on the identification information, the user profile that is associated with the legacy environment; and
   initiating conversion of the user profile from the legacy environment to the production environment.

9. The system of claim 7, wherein identifying the legacy profile information further comprises:
   identifying, based at least on the indication, the user profile associated with the legacy environment;
   providing, to a data replicator, the user profile associated with the legacy environment; and
   causing the user profile to be replicated within the conversion environment to generate a reference data source.

10. The system of claim 7, the operations further comprising:
    generating, based at least on the indication and the one or more update indications, a conversion dashboard configured to indicate conversion progress associated with the user profile; and
    generating, based at least on the conversion dashboard, a user interface that displays the conversion progress associated with the user profile.

11. The system of claim 7, wherein receiving one or more update indications from the conversion environment further comprises:
    generating, based at least on the indication and the one or more update indications, a conversion dashboard configured to indicator conversion progress associated with the user profile; and
    generating, based at least on the conversion dashboard, a user interface that displays the conversion progress associated with the user profile.

12. The system of claim 7, wherein generating the additional user profile that is associated with the production environment for the user further comprises:
    determining a production profile template based at least on the user profile;
    causing the production environment to generate the additional user profile within a production profile database; and
    causing the conversion environment to provide the production profile information to populate the additional user profile.

13. The system of claim 12, the operations further comprising:
    determining that the additional user profile has been configured for utilization within the production environment;
    determining, based at least on the production profile information, that the user profile has been utilized to generate the additional user profile; and
    enabling the additional user profile within the production environment.

14. The system of claim 7, the operations further comprising:
    determining, based at least on the user profile, one or more legacy services that are provided by the legacy environment and utilized by the user profile;
    determining, based at least on the production profile information generated from the legacy profile information, one or more production services that are associated with the additional user profile and provided by the production environment;
    determining that the one or more production services are substantially equivalent to a set of legacy services and a legacy service of the one or more legacy services that is unassociated with a production environment equivalent service; and
    generating a service bridge that enables the additional user profile to access the legacy service from the production environment.

15. A method comprising:
    determining a legacy user event within a legacy environment;
    causing an eligibility engine to determine whether a legacy profile associated with the legacy user event satisfies an eligibility check;
    replicating, based at least on the legacy profile satisfying the eligibility check, the legacy profile within a conversion environment;
    causing the conversion environment to convert the legacy profile to a production profile;
    verifying that profile information extracted from the legacy profile has been utilized to populate the production profile; and
    generating the production profile within a production environment.

16. The method of claim 15, wherein determining the legacy user event further comprises:
    monitoring a plurality of legacy profiles associated with the legacy environment;
    determining that the legacy user event has been published by a legacy profile database associated with the legacy profile; and
    determining that the legacy user event includes an indication of a modification applied to the legacy profile.

17. The method of claim 15, further comprising:
    determining an additional legacy user event within the legacy environment;
    causing the eligibility engine to determine whether an additional legacy profile associated with the additional legacy user event satisfies the eligibility check; and
    determining an eligibility issue associated with the additional legacy profile; and
    causing the eligibility engine to monitor the additional legacy profile to detect a profile update that resolves the eligibility issue.

18. The method of claim 17, wherein causing the eligibility engine to monitor the additional legacy profile to detect the profile update further comprises at least one of:
    transmitting, to a user associated with the additional legacy profile, a notification that causes the user to provide additional profile information that resolves the eligibility issue;
    transmitting, to an administrator associated with the legacy environment, an indication of the eligibility issue; or
    generating, based at least on the eligibility issue identified by the eligibility engine, the profile update that resolves the eligibility issue.

19. The method of claim 15, wherein replicating the legacy profile within the conversion environment further comprises:
- transmitting, to a data replicator, an indication of the legacy profile;
- causing the legacy environment to lock the legacy profile and substantially prevent legacy profile updates;
- causing the data replicator to receive the profile information associated with the legacy profile, wherein the profile information includes profile usage patterns, historical profile data, profile access information, payment information, and user information; and
- causing the data replicator to generate a replica legacy profile within the conversion environment that includes the profile information.

20. The method of claim 19, wherein generating the production profile within the production environment further comprises:
- generating, within a production profile database associated with the production environment, a production profile template;
- populating the production profile template with the profile information; and
- enabling the production profile within the production environment, wherein enabling the production profile includes disassociating a user from the legacy profile and associating the user with the production profile.

* * * * *